INVENTORS
ERNST GAEUMANN ET AL

Oct. 20, 1964   E. GAEUMANN ETAL   3,153,621
PROCESS FOR PRODUCING FERRIOXAMINES
Filed Sept. 22, 1960   8 Sheets-Sheet 6
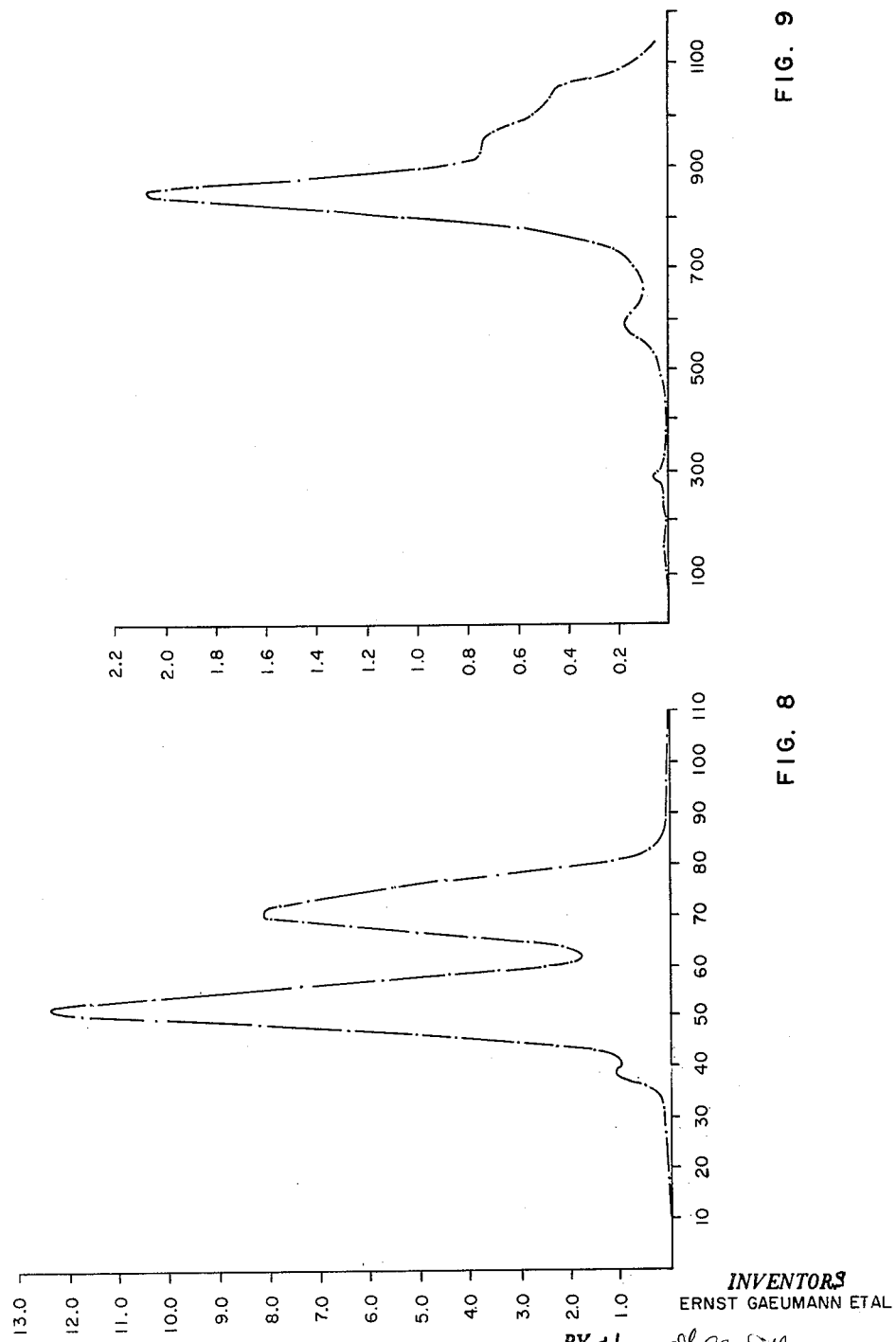
*INVENTORS*
ERNST GAEUMANN ETAL Oct. 20, 1964   E. GAEUMANN ETAL   3,153,621
PROCESS FOR PRODUCING FERRIOXAMINES
Filed Sept. 22, 1960   8 Sheets-Sheet 7

INVENTORS
ERNST GAEUMANN ET AL
BY
THEIR ATTORNEYS

INVENTORS
ERNST GAEUMANN ET AL
BY
THEIR ATTORNEYS

United States Patent Office 3,153,621
Patented Oct. 20, 1964

3,153,621
PROCESS FOR PRODUCING FERRIOXAMINES
Ernst Gaeumann and Vladimir Prelog, Zurich, Hans Bickel, Binningen, and Ernst Vischer, Basel, Switzerland, assignors to Ciba Corporation, a corporation of Delaware
Filed Sept. 22, 1960, Ser. No. 57,834
Claims priority, application Switzerland, Sept. 25, 1959, 78,652, 78,653; Mar. 18, 1960, 3,063/60, 3,064/60
4 Claims. (Cl. 195—80)

A large number of biological and physiologically active substances have already been isolated from materials of biological origin, especially plant material, animal organs and micro-organisms. Nothing, however, was known of the wide-spread occurrence of a certain group of growth-promoting substances.

The present invention is based on the observation that from plant organisms, particularly Actinomycetes, and from extracts thereof growth-promoting substances in pure or enriched form can be obtained which are hereinafter referred to as ferrioxamines.

The ferrioxamines are organic compounds containing nitrogen and iron. They are of brownish red color and readily soluble in acids and strongly polar solvents, such as water, dimethyl-formamide, glycol, ethyleneglycol-mono-methyl-ether as well as in lower aliphatic alcohols, such as methanol. They are further restrictedly soluble in higher aliphatic alcohols, and in aromatic alcohols and phenols, for example in butanol, benzyl alcohol and phenol. The hydrolysates of the ferrioxamines contain substances of positive reaction to ninhydrin. Chemically, the ferrioxamines are related to a group of antibiotic substances, called "Sideramycins." To the sideramycins belong, inter alia, the iron-containing antibiotics grisein, albomycin, the ferrimycins, the antibiotic 1787 (H. Thrum, Naturwiss. 44, page 561 (1957)), and the substances L.A. 5352 and L.A.5937 (P. Sensi and M. T. Timbal, Antibiotics & Chemotherapy 9, page 160 (1959)).

Crude ferrioxamine which for instance is obtained in the course of fermentation of streptomycetes is usually a mixture of various components. Ferrioxamine B is the main product of the ferrioxamines formed during the fermentation of *S. pilosus,* Ettlinger et al., NRRL 2857 (ETH 21748). In addition, other substances are produced which are designated ferrioxamines A, C, $D_1$, $D_2$ E and F. By Craig's distribution of the crude product obtained from the culture filtrate (2 to 10 days' fermentation at 27° C.) by extraction with a mixture of phenol and chloroform (1 g.:1 cc.), 5 fractions are obtained whose extinction at 425 m$\mu$ is shown in FIG. 1. From the main fraction III there is obtained by chromatography on the ion exchange resin Dowex 50-$WX_2$ pure ferrioxamine B hydrochloride as a brown-red powder (FIG. 2, fractions 93-125).

Ferrioxamine B hydrochloride is soluble in water and strongly polar organic solvents. In paperchromatography and multiple distribution it behaves as a uniform substance of similar polarity to ferrimycin $A_1$ and $A_2$, but differs from these by its considerably greater stability. In a weak acetic acid solution it travels in the course of electrophoresis with only a slightly lower speed than the ferrimycins.

The following properties were found for ferrioxamine B hydrochloride. Microanalysis after 48 hours at 20° C. under 0.001 mm. of pressure: C 48.04%; H 7.41%; N 11.21%; Cl 5.25%; Fe 7.67%; P 0%; S 0%; titration: $pK^*_{MCS}$ (Helv. 37, 1872 (1954)); 9.74; equivalent weight: 704. Absorption spectrum in water:

$$\lambda \text{ max. } 430 \text{ m}\mu \text{ with } E^{1\%}_{1\text{ cm.}} = 39.0$$

Infrared spectrum in heavy paraffin oil inter alia bands at 3230, 2900, 1640, 1573, 1461, 1377, 1260, 1225, 1185, 1132, 1028 cm.$^{-1}$ double bands at 989, 975, 935, 810, 750 cm.$^{-1}$; see FIG. 3. Partition coefficient, paperchromatography and paperelectrophoresis: see Table 1, FIG. 4 and FIG. 5.

In the course of hydrolysis with dilute hydrochloric acid the following compounds can, inter alia, be identified: succinic acid, 1-amino-5-hydroxylamino-pentane, cadaverine and hydroxylamine. When the hydrolysis is carried out with hydriodic acid, neither 1-amino-5-hydroxylamino-pentane nor hydroxylamine is formed. When reacted with 2:4-dinitrofluorobenzene, ferrioxamine B forms a 2:4-dinitro-phenyl derivative.

From the by-fractions II, IV and V (cf. FIG. 1) obtained by Craig's distribution of the crude ferrioxamine mixture there can be isolated by chromatography on ion exchange columns further compounds containing iron and having antisideramycin activity (see below). According to their behaviour in paperchromatography (FIG. 4) and on ion exchange columns they are designated ferrioxamine A, C, $D_1$, $D_2$, E and F, respectively.

Ferrioxamines A and C isolated from fractions II and IV respectively (cf. FIG. 1) are in their physical-chemical behaviour very similar to ferrioxamine B. In paperchromatography and in multiple distribution A is slightly more polar than B. In the case of C it is the other way round. This finding corresponds to the slightly increased basicity of A as compared with B and its slightly greater electrophoretic migration velocity in weak acetic acid solution, and to the slighter basicity and electric mobility of C as compared with B, respectively (FIG. 5). A and C also show infra-red spectra and solubility properties similar to ferrioxamine B and, like the latter, could till now only be obtained as hydrochlorides in amorphous form.

Ferrioxamine A hydrochloride is a brown-red powder which is readily soluble in water, methanol, alcohol, glacial acetic acid and dimethylformamide. It is insoluble in ether, acetone, ethyl acetate and chloroform. $R_f$ in solvent system I 0.35 in solvent system V 0.21 (Table 1). Partition coefficient in system VI 0.111 (Table 1). Paper electrophoresis, cf. FIG. 5. Microanalysis: C 44.21%, H 7.52%, N 12.63%, Fe 7.95%, Cl, 5.93%. Titration: $pK_{MCS}$: 9.79, equivalent weight: 634. Uultraviolet spectrum in water:

$$\lambda \text{ max. } 430 \text{ m}\mu \ (E^{1\%}_{1\text{ cm.}} = 37)$$

The infrared spectrum in potassium bromide shows: inter alia bands at 2.92$\mu$ (s.), 3.42$\mu$ (m.), 6.10$\mu$ (s.), 6.32$\mu$ (s.), 6.88μ (m.), 7.30μ (w.), 7.92μ (w.), 8.10μ (w.), 8.49μ (w.), 8.98μ (w), 9.55μ (w.), 10.15μ (w.), 10.67μ (w.) (see FIG. 11).

Ferrioxamine A gives a postive color reaction with ninhydrin. The iron bound in ferrioxamine A is removed from the complex when subjected to the action of a mineral acid or of strong alkali. Iron free ferrioxamine A is colorless. It can be transformed back to ferrioxamine A with ferric chloride. It reacts also with other metal ions with formation of the corresponding metal complexes, for example the greenish colored copper-complex. For further characteristics see Table 1.

Ferrioxamine C hydrochloride shows approximately the same solubilities as A. $R_f$ in solvent system I 0.54, in solvent system V 0.37 (Table 1). Paper electrophoresis see FIG. 5; partition coefficient in system VI 0.489 (Table 1). Microanalysis: C. 48.33%, H 7.92%, N 10.20%, Cl 5.15%, Fe 6.182%. Titration: $pK_{MCS}$ 8.88; equivalent weight 762. Ultraviolet spectrum in water:

$$\lambda \text{ max. } 430 \text{ m}\mu \text{ } (E_{1 \text{ cm.}}^{1\%}=39)$$

The infrared spectrum in potassium bromide shows inter alia bands at: 2.92μ (s.), 3.43μ (s.), 5.85μ (m.), 6.10μ (s.), 6.33μ (s.), 6.87μ (s.), 7.30μ (m.), 7.95μ (m.), 8.23μ (w)., 8.52μ (m.), 9.65μ (w.), 13.23μ (m.), (see FIG. 12).

Ferrioxamine C gives a positive color reaction with ninhydrin. The iron bound in ferrioxamine C is removed from the complex when subjected to the action of a mineral acid or of strong alkali. Iron free ferrioxamine C is colorless. It can be transformed back to ferrioxamine C with ferric chloride. It reacts also with other metal ions with formation of the corresponding metal complexes, for example the greenish colored copper-complex.

The lipophilic ferrioxamines $D_1$, $D_2$ and E isolated by ion exchange chromatography from fraction V (FIG. 1), which in the solvent systems V and VI (Table 1) show greater $R_f$ values than 0.5 and distribution coefficients above 1, behave as neutral compounds in electrophoresis and titration (cf. Table 1, FIG. 4 and FIG. 5). Ferrioxamine D which is isolated by ion exchange chromatography as the most rapidly travelling substance from a band appearing uniform (cf. FIG. 8) can be separated by simple distribution between chloroform and water into the more lipophilic ferrioxamine $D_1$, crystallizing in the form of long red prisms from a mixture of methanol and ether, and into ferrioxamine $D_2$, which is only formed in very small quantities. Ferrioxamine $D_1$ is readily soluble in water, methanol, alcohol, glacial acetic acid, methyl Cellosolve and chloroform, sparingly soluble in ether, acetone, ethyl acetate, pyridine and dimenthylformamide. It crystallizes from a mixture of methanol and ether in red needles. After being crystallized three times it melts at 194–200° C. $R_f$ in solvent system I 0.73, $R_f$ in solvent system V 0.72 (Table 1). Partition coefficient in system VI 1.80 (Table 1). Electrophoresis, see FIG. 5. Microanalysis: C 49.31%, H 7.47%, N 12.37%, Cl 0%, Fe 7.66%. Titration: no acid or basic functions detectable. Uultraviolet spectrum in water:

$$\lambda \text{ max. } 430 \text{ m}\mu, E_{1 \text{ cm.}}^{1\%}=44$$

Infrared spectrum in postassium bromide shows inter alia bands at 2.95μ (s.), 3.06μ (s.), 3.25μ (w.), 3.43μ (s.), 6.08μ (s.), 6.35μ (s.), 6.86μ (s.), 7.30μ (m.), 7.94μ (m.), 8.20μ (w.), 8.49μ (w.), 8.83μ (w.), 9.00μ (w.), 9.65μ (w.), 10.00μ (w.), 10.31μ (w.), 10.67μ (w.), 12.20μ (w.), 13.30μ (m.), see FIG. 13. Ferrioxamine $D_1$ gives no color reaction with ninhydrin. The iron bound in ferrioxamine $D_1$ is removed from the complex when subjected to the action of a mineral acid or of strong alkali. Iron free ferrioxamine $D_1$ is colorless. It can be transformed back to ferrioxamine $D_1$ with ferric chloride. It reacts also with other metal ions with formation of the corresponding metal complexes, for example the greenish colored copper-complex. Ferrioxamine $D_2$: Infrared spectrum in potassium bromide shows inter alia bands at 2.95μ (s.), 3.43μ (m.), 6.08μ (s.), 6.36μ (s.), 6.90μ (s.), 8.49μ (w.), 8.87μ (w.), 9.65μ (w.), 10.05μ (w.), 10.70μ (w.), 13.22μ (w.), see FIG. 16. $R_f$ in solvent system I 0.64, $R_f$ in solvent system V 0.68 (Table 1). Paper electrophoresis see FIG. 5. Ferrioxamine E which has a more differentiated infrared spectrum than the other ferrioixamines (see FIG. 14) also differs from them by its poor solubility in water and methanol.

Microanalysis: C 49.80%, H 7.37%, N 12.48%, Cl 0%, Fe 8.14%.

Titration: no acid or basic functions detectable. Ultraviolet spectrum in water:

$$\lambda \text{ max. } 430 \text{ m}\mu \text{ } (E_{1 \text{ cm.}}^{1\%}=42)$$

The infrared spectrum in potassium bromide shows inter alia bands at 2.92μ (s.), 3.02μ (s.), 3.45μ (s.), 5.96μ (s.), 6.15μ (s.), 6.36μ (s.), 6.90μ (s.), 7.10μ (m.), 7.15μ (m.), 7.39μ (m.), 7.82μ (w.), 7.98μ (m.), 8.45μ (w), 8.54μ (w.), 8.85μ (w.), 9.01μ (w.), 9.20μ (w.), 9.98μ (m.), 10.07μ (w.), 10.23μ (w.), 10.43μ (w.), 10.71μ (w.), 11.87μ (w.), 13.20μ (m.), 13.66μ (w.), (see FIG. 14).

Ferrioxamine E gives no color reaction with ninhydrin. The iron bound in ferrioxamine E is removed from the complex when subjected to the action of a mineral acid or of strong alkali. Iron free ferrioxamine E is colorless. It can be transformed back to ferrioxamine E with ferric chloride. It reacts also with other metal ion with formation of the corresponding metal complexes, for example the greenish colored copper-complex. Ferrioxamine F, which according to its behaviour in paperchromatography and in counter-current distribution also belongs to the lipophilic group ($D_1$, $D_2$, E) shows however in contrast to $D_1$, $D_2$ and E, basic properties and is isolated as hydrochloride (cf. FIG. 4 and FIG. 5). Ferrioxamine F hydrochloride is readily soluble in water, methanol, pyridine, glacial acetic acid, ethanol, dimethylformamide; sparingly soluble in chloroform, insoluble in ethyl acetate, acetone and ether. Microanalysis: C 50.44%, H. 7.29%, N 10.53%, Cl 4.10%, Fe 5.57%. $R_f$ in solvent system V 0.80 (Table 1). Partition coefficient in system VI 3.12 (Table 1). Electrophoresis, see FIG. 5. Titration: $pK_{MCS}$ 9.75, equivalent weight 695. The infrared absorption spectrum in potassium bromide shows inter alia bands at 2.95μ (s.), 3.45μ (m.), 6.10μ (s.), 6.37μ (s.), 6.92μ (m.), 7.40μ (w.), 7.97μ (w.), 8.50μ (w.), 8.88μ (w.), 9.72μ (w.), 10.10μ (w.), 10.70μ (w.), 13.75μ (w.) (see FIG. 15). Ultra-violet absorption in $H_2O$:

$$\lambda \text{ max. } 430 \text{ m}\mu, E_{1 \text{ cm.}}^{1\%}=34$$

Ferrioxamine F gives a positive color reaction with ninhydrin. The iron bound in ferrioxamine F is removed from the complex when subjected to the action of a mineral acid or of strong alkali. Iron free ferrioxamine F is colorless. It can be transformed back to ferrioxamine F with ferric chloride. It reacts also with other metal ions with formation of the corresponding metal complexes, for example the greenish colored copper-complex.

In Table 1 below further characteristic physical data of the ferrioxamines which have hitherto been isolated are shown by way of comparison.

The ferrioxamines promote the growth of a large number of organisms. For instance, they have such an effect on *Bacillus subtilis*, *Micrococcus pyogenes* var. *aureus*,

TABLE 1

| Ferrioxa-mine | Paper electro-phoresis [a] | Paper chromatography | | Counter-current distribution | Extinction at 430 mμ | Titration | |
|---|---|---|---|---|---|---|---|
| | | $R_fI$ [b] | $R_fV$ [c] | K, VI [d] | $E_{1\,cm}^{1\%}$ | $pK_{MCS}$ [e] | Equivalent weight |
| A | 13.6 | 0.35 | 0.21 | 0.11 | 37 | 9.89 | 634 |
| B | 13.0 | .44 | .29 | .23 | 39 | 9.74 | 704 |
| C | 12.3 | .54 | .37 | .49 | 39 | 8.88 | 762 |
| D₁ | 3.9 | .73 | .72 | 1.80 | 44 | Neutral | |
| D₂ | 3.9 | .64 | .48 | | | Neutral | |
| E | 3.9 | .68 | .59 | 1.59 | 42 | Neutral | |
| F | 12.5 | | .80 | 3.12 | 34 | 9.75 | 695 |

[a] Cm path in 0.33 N acetic acid after 4½ hours at 220 V. In comparison fructose travels 3.9 cm.
[b] $R_fI$: $R_f$-value in system I: n-butanol-glacial acetic acid-water (4:1:5).
[c] $R_fV$: $R_f$-value in system V: tertiary butanol-water-saturated aqueous sodium chloride solution-0.1 N HCl (50:25:25:1), paper impregnated with acetone-water-saturated aqueous sodium chloride solution (6:3:1).
[d] K VI: partition coefficient in system VI: n-butanol-benzyl alcohol-water-saturated aqueous sodium chloride solution-0.1 N HCl (200:100:300:60:3). Distribution of 10 mg. over 34 stages each of 3 cm. organic and 3 cm. aqueous phase at 23–25° C. Evaluation by measuring the extinction at 425 mμ (2 cm. of the fractions diluted with alcohol to 10 cm.).
[e] W. Simon et al., Helv. 37, 1872 (1954).

In Table 2 are shown comparative chemical and physical data for ferrioxamine B and related growth-promoting substances as well as for a few sideramycin antibiotics, such as grisein A, albomycin and ferrimycin A.

The salts of the basic ferrioxamines A, B, C and F are derived from the known inorganic and organic acids, for example from hydrochloric acids, sulfuric acids, nitric acid and phosphoric acids, thiocyanic acid, acetic acid, propionic acid, valeric acid, glycollic acid, lactic acid, pyroracemic acid, malonic acid, pulmitic acid, oletic acid, succinic acid, citric acid, tartaric acid, mandelic acid, gultamic acid, pantothenic acid, maleic acid, fumaric acid, benzoic acid, cinnamic acid, salicylic acid, para-amino-salicylic acid, 2-phenoxy benzoic acid, 2-acetoxy-benzoic acid, methane sulfonic acid, ethane sulfonic acid, methionine, tryptophane, lysine or arginine. They are neutral or acid salts. They are prepared by double conversion of salts, for example of ferrioxamine sulfate with calcium pantothenate, or by anion exchange on anion exchangers, for example of ferrioxamine chloride on a strongly basic exchanger, e.g. Amberlite IRA—400 in the sulfate form.

*Saccharomyces cerevisiae*, *Ustilago sphaerogena* and *Chlamydomonas eugametos*. In Table 3 there are summarized as examples the results of tests with *Ustilago sphaerogena* (smut fungus) and with *Chlamydomonas eugametos* (chlorphyceae) for which an enriched preparation of ferrioxamine B was used.

TABLE 3

| | Relative growth compared with an untreated control specimen, Ferrioxamine B addition (μg./cc.) | | | | | | |
|---|---|---|---|---|---|---|---|
| | 0 | 100 | 10 | 1 | 0.1 | 0.01 | 0.001 |
| *Ustilago sphaerogena* (24 hours culture), percent | 100 | | 540 | 405 | 247 | 158 | 111 |
| *Chlamydomonas eugametos* (4 days culture), percent | 100 | 280 | 271 | 136 | 98 | 98 | |

Other organisms—for example representatives of the genus Arthrobacter, such as *Arthrobacter terregens* and

TABLE 2

| Substance | Analytical Values (4) | | | | | Molec. weight | $pK^*_{MCS}$ [d] | Absorption | | Identified hydrolysis products | (e) |
|---|---|---|---|---|---|---|---|---|---|---|---|
| | C | H | N | Cl | Fe | | | λ max | $E_{1\,cm.}^{1\%}$ | | |
| Ferrimycin A [1] | 48.65 | 7.09 | 12.95 | 6.10 | 4.56 | [a] 1,106 | 4.18; 7.88 | 228 / 319 / 425 | 282 / 28.2 / 22.6 | NH₃, succinic acid, 1-amino-5-hydroxylamino-pentane, 5-aminovaleric acid, cadaverine, cryst. substance with λmax 227 and 323 mμ, proline and unidentified ninhydrin-positive substances. | (0.83) |
| Grisein A [2] | 43.95 | 5.65 | 12.97 | | 5.14 | [a] 1,034 | | 265 / 420 | 108 / 28.9 | Methyluracil, glutamic acid | |
| Albomycin [3] | | | | | 4.16 | 1,270–[b] 1,346 | | | | Methyluracil, serine, ornithine | |
| Ferrioxamine B hydrochloride | 48.04 | 7.41 | 11.21 | 5.25 | 7.67 | [a] 704 | 9.74 | 430 | 39.0 | NH₃, succinic acid, 1-amino-5-hydroxylamino-pentane, cadaverine, 5-aminovaleric acid, hydroxylamine, no glycine, ornithine or serine. | (1.2) |
| Ferrichrome [4] | 44.02 | 5.90 | 16.55 | | 7.35 | [c] 725 | | 425 | 39.4 | NH₃, glycine, ornithine | 2.89 |
| Ferrichrome A [4] | 44.75 | 5.80 | 11.18 | | 5.3 | [c] 1,100 | | 440 | 33.8 | Serine, glycine, ornithine | 3.01 |
| Coprogen [5] | 50.96 | 6.83 | 10.26 | | 6.61 | | | 440 | 36.6 | | |

[a] By titration.
[b] According Fe-, SO₄- and NH₂-content.
[c] Found by two different methods.
[d] W. Simon, E. Kovats, L. H. Chopard-dit-Jean and E. Heilbronner, Helv. 37, 1872 [1954].
[e] "Hydroxylamine-values" per atom Fe found colorimetrically according to Csaky [6]; bracketed values are uncorrected.
[1] U.S. Patent Application Ser. No. 32294 filed May 27, 1960, by us.
[2] F. A. Kuehl et al., J. Amer. Chem. Soc. 73, 1770 (1951).
[3] G. F. Gause, Brit. Med. J. 1955, 1177.
[4] J. B. Neilands, Bact. Rev. 21, 101 (1957).
[5] C. W. Hesseltine et al., J. Amer. Chem. Soc. 74, 1362 (1952).
[6] T. Z. Csaky, Acta Chem. Scand. 2, 450 (1948).

*Arthrobacter flavescens*—can develop at all only in the presence of ferrioxamines; that is to say that in these cases the ferrioxamines have a vitamin-character similar to that observed for the growth factors ferrichrome, terregens factor and coprogen (Bact. Rev. 21, page 101 [1957]).

It is another biological property of the ferrioxamines that they are capable of counteracting competitively the antibacterial action of antibiotics belonging to the group of the sideramycins towards Gram-positive organisms.

The antisideramycin action of the ferrioxamines is shown by the antibiotics albomycin, grisein, A–1787, ferrimycin and A–22765, all of which also display a cross-resistance with grisein. It is surprising that the ferrioxamines counteract the action of the gresin-like sideramycins towards Gram-positive bacteria but not towards Gram-negative bacteria.

The antagonism between the ferrioxamines and the sideramycins, which is called "antisideramycin activity," can be observed both "in vitro" and "in vivo." The antagonising action of ferrioxamine B on the antibacterial activity of various antibiotics is shown in the following table. The test organisms used were *Escherichia coli*, *Bacillus subtilis* and *Staphylococcus aureus*. The antibiotics were tested in the modified test according to Bonifas towards ferrioxamine B (1 mg. per cc.), which is described below.

TABLE 4

| Antibiotic | Antagonism of ferrioxamine B on antibiotic activity against— | | |
|---|---|---|---|
| | *Bacillus subtilis* | *Staphylococcus aureus* | *Escherichia coli* |
| Ferrimycin | Competitive | Competitive | $\phi$.[1] |
| Grisein (40,000 u./mg.) | do | do | Nil. |
| Albomycin | do | do | Do. |
| A 1787 | do | do | Do. |
| A 22765 [2] | do | do | $\phi$. |
| Neomycin | Nil | Nil | Nil. |
| Streptomycin | do | do | Do. |
| Streptothricin | do | do | Do. |
| Viomycin | do | do | Do. |
| Penicillin | do | do | $\phi$. |

[1] Signifies that the antibiotic so marked is practically inactive towards this test organism.
[2] (Strain *S. aureofaciens* Duggar A-22765.)

Further antibiotics not affected by ferrioxamines, not shown in the above table are: Acetomycin, the actinomycins C, X, I and Z, angolamycin, carbomycin, chartreusin, chlorotetracycline, cycloserin, the cinerubines, desertomycin, erythromycin, exfoliatin, granaticin, holomycin, leucomycin, megacidin, methymycin, narbomycin, novobiocin, oleandomycin, oxytertacycline, picromycin, rhodomycin, the spiramycines, sterptogramin, the tetriomycines and thiolutin.

The antisideramycin activity in vitro of the ferrioxamines facilitates a qualitative indentification and quantitative determination of the ferrioxamines, since the test developed by Bonifas (V. Bonifas, Experientia 8, page 234 [1952]) specifically for the determination of synergistically active substances can be suitably applied. For this purpose plates, e.g. petri dishes containing a layer of a suitable agar medium are inoculated with *Bacilus subtilis* Cohn emend. Prazmowski or *Staphylococcus aureus* Rosenbach are prepared. Strips of filter paper, for instance of Whatmann paper No. 1 (5 mm. wide) impregnated with a solution of a sideramycin antibiotic, for example 10γ/cc. ferrimycin in methanol are placed on these agar layers. At right angles other strips, likewise of 5 mm. width, saturated with the solution whose content of ferrioxamine is to be tested are placed on the sideramycin containing strips. After incubation for 9–15 hours at 36° C. the influence of the ferrioxamines on the antibiotic activity of ferrimycin is easy to recognise: In the inhibition aureole which forms from the strips saturated with the antibiotic there is formed, at the crossing of the two strips, a wedge-shaped constriction, the form and dimensions of which under standard conditions are used for the quantitative determination of the ferrioxamine concerned (see. FIG. 10).

If a solution contains both ferrimycin and ferrioxamine, it must be heated to 60° C. for 30 minutes at neutral pH. By this procedure the antibiotic activity of the ferrimycin is destroyed, while the ferrioxamine remains unaffected and can consequently be determined quantitatively.

In this antisideromycin test ferrioxamine B is the most effective of all the ferrioxamines. With Staphylococcus aureus as test organisms the other ferrioxamines show the following activities in relation to B: A 51%, C 16%, $D_1$ 8%, $D_2$ 3%, E 4% and F 30%.

The aforementioned substances ferrichrome, terregens factor and coprogen resemble the ferrioxamines in their vitamin-character with respect to *Arthrobacter terregens* and *Arthrobacter flavescens*. On the other hand the aforementioned typical growth-promoting effect of the ferrioxamines on *Bacillus subtilis*, *Micrococcus pyogenes*, *Saccharmocyces cerevisiae*, *Ustilago sphaerogena* and *Chlamydomonas eugametos* has not been observed with the three substances ferrichrome, terregens factor and coprogen. Furthermore nothing is known about an antagonistic effect of these substances on the antibacterial activity of the sideramycin antibiotics, which is typical for the ferrioxamines.

In paperchromatography ferrichrome differs distinctly in direct comparison in the system V (cf. Table 1) from the ferrioxamines B—F, but shows in this system a similar $R_f$-value to ferrioxamine A. On the other hand, as neutral substance it is easily distinguished from the strongly basic ferrioxamine A in paper-electrophoresis in 0.33 N-acetic acid. The terregens factor contains only traces of iron and is consequently different from all the ferrioxamines. Coprogen can be easily distinguished from the ferrioxamines A, B, D and E by means of its analytical data. The ratio percent C/percent N is in the case of coprogen 4.97, in the case of the ferrioxamines 3.5–4.3. In the case of ferrioxamines C and F this difference is not so pronounced (percent C/percent N=4.74–4.78). Ferrioxamines C and F are strong bases which are isolated as hydrochlorides whereas coprogen, according to the present date, is a neutral substance (Journ. Amer. Chem. Soc. 74, 1362 (1952)).

The ferrioxamines, their derivatives and fission products and the salts of these compounds are obtained by isolating the new growth-promoting substances from plant organisms or extracts thereof by methods known per se taking the above chemical and physical data into consideration and using the antisideramycin test and, if desired, the salts, derivatives or fission products of the new compounds are prepared.

Starting materials suitable for the preparation of the ferrioxamines are for example: Organs of higher plants such as dicotyledoneae, e.g. Solenanaceae, for instance *Solanum lycopersicum* L. or Umbelliferae, for instance *Daucus carota* L., and Monocotyledoneae, e.g. Commelinaceae for instance *Rhoeo discolor* (L. Hér.) Hance, cultures of algae, for example of *Chlamydomonas eugametos*, or above all cultures of microorganisms, for example of representatives of the genus Streptomyces, of bacteria for example of *B. subtilis* or of yeasts, for example of *Saccharomyces cerevisiae*. The antisideramycin activity can be observed by way of the aforementioned test either in the crude extract or in the culture filtrate.

An especially preferred source are cultures of strains of Streptomycetes which according to the characteristics proposed by Ettlinger et al. (Arch. Mikrobiol, 3, page 326 [1958]) belong to the following species: *Streptomyces griseoflavus* (Krainsky) Waksman et Henrici, *Streptomyces lavendulae* (Waksman et Curtis) Waksman et Henrici, *Streptomyces galilaeus* Ettlinger et al., *Streptomyces pilosus* Ettlinger et al., *Sterptomyces polychromogenes*

Hagemann, Penasse et Teillon, *Streptomyces viridochromogenes* (Krainsky) Waksman et Henrici, *Streptomyces aureofaciens* Duggar, *Streptomyces olivaceus* (Waksman) Waksman et Henrici, *Streptomyces griseus* (Krainsky) Waksman et Henrici), *Streptomyces glaucescens* Gause et al.

The following table lists the specific features characterizing the Streptomycetes strains capable of producing ferrioxamines.

activity in general within 2 to 10 days. 0.1% of ferric chloride is then added to the culture and the mycelium is separated from the culture filtrate, whereupon the bulk of the ferrioxamines is found in the culture filtrate. Substantial amounts of ferrioxamines however still remain adsorbed on the mycelium so that the latter is advantageously thoroughly washed, for instance with water and/or an aqueous organic solvent, such as an alcohol, for example aqueous methanol.

TABLE 5

| Characteristics Species | Morphology of spores | Color of air mycelium | Morphology of air mycelium | Melanoid pigment |
|---|---|---|---|---|
| S. griseoflavus (Krainsky) Waksman et Henrici. | Spores with short spikes. | Ash grey | Spore chains with open, regular spirals, often over 6 coils. | Absent. |
| S. pilosus Ettlinger et al | Spores with fine brittle hairs. | do | Spore chains with open, regular spirals, generally over 6 coils. | Present. |
| S. viridochromogenes (Krainsky) Waksman et Henrici. | Spores with short spikes. | Pale blue | Spore chains with open, regular spirals, often over 6 coils. | Do. |
| S. olivaceus (Waksman) Waksman et Henrici. | Smooth | Ash grey | Spore chains monopodially branched, straight or wavy. | Absent. |
| S. aureofaciens Duggar | do | do | Spore chains monopodially branched, with irregular, open spirals. | Do. |
| S. galilaeus Ettlinger et al | do | do | Spore chains monopodially branched, long straight main axis, open regular spirals, generally more than 6 coils. | Present. |
| S. lavendulae (Waksman et Curtis) Waksman et Henrici. | do | Pale carmine to cinnamon brown. | Spore chains with open irregular spirals at the ends of long straight pieces | Do. |
| S. polychromogenes Hagemann et al | do | Pale carmine to cinnamon. | Spore chains straight or wavy | Absent. |
| S. griseus Waksman et Henrici | do | Yellowish to greenish grey. | Spore chains wavy, sympodially branched, bunches without spirals. | Do. |

Substantial amounts of the ferrioxamines are advantageously prepared from cultures of the aforementioned micro-organisms. Particularly good results have been obtained in this connection with the aforementioned Streptomyces strains which are easy to grow on a large scale. The present invention is however, not restricted to the use of representatives of the aforementioned species but it includes also the use of strains of other species capable of producing the ferrioxamines and more especially of variants of all these organisms such as are obtained, for example, by selection or mutation, more especially with irradiation with ultra-violet or X-rays or under the action of nitrogen mustard oils.

To prepare a substantial amount of the ferrioxamines for example, a strain possessing the properties of the aforementioned Streptomycetes is grown under aerobic conditions, for example in an aqueous nutrient solution containing carbohydrates, nitrogenous compounds and inorganic salts until the solution displays a substantial ferrioxamine action, whereupon the ferrioxamines are isolated. Alternatively, plants can be grown such as Chlorophyceae, or bacteria such, for example, as *B. subtilis,* and from these the ferrioxamines are isolated in pure or enriched form. Assimilable carbohydrates suitable for growing the aforementioned microorganisms are for example glucose, saccharose, lactose, mannitol, starches or glycerol. Suitable nitrogenous nutrients and if desired growth-promoting substances are: amino acids, peptides and proteins and breakdown products thereof such as peptone or tryptone, also meat extracts, water-soluble constituents of cereal grains, such as maize and wheat of distillation residues of the manufacture of alcohol, of yeasts, seeds, more especially of the rape and soybean plants, cotton seeds and the like, also ammonium salts and nitrates. Inorganic salts present in the nutrient solution may be, for example, chlorides, carbonates, sulfates of alkali metals, alkaline earth metals, magnesium, iron, zinc or manganese.

The microorganisms are grown under aerobic conditions, for example in a static surface culture or preferably submerged with shaking or stirring with air or oxygen in shaking flasks or in the known fermenters. If Streptomyces strains are used the cultivation temperatures range from 18 to 40° C. Under these conditions the nutrient solution develops a substantial ferrioxamine In a similar manner also bacteria, for example *B. subtilis,* can be grown and the culture filtrates used as source for the isolation of the ferrioxamines.

The ferrioxamines can be isolated from the aforementioned materials, more especially from the culture filtrates of fungus or bacterium cultures, by as such known methods for example by one of the methods mentioned below or by a combination of two or more of such methods:

(1) An adsorbent can be used, for example an active carbon such as Norit, an activated earth, such as Frankonit, fuller's earth or fluoridine or an adsorber resin such as Asmit. The adsorbates are advantageously eluted with a mixture of water with a water-miscible organic solvent, for example with a mixture of water+methanol, water+pyridine, dilute acetic acid+methanol or a mixture of water+methanol+glacial acetic acid+butanol. In eluting a Frankonit or Norit adsorbate particularly good results have been achieved with a mixture of 4 parts by volume of water and 1 part by volume of pyridine.

(2) According to another method of isolation the ferrioxamines are adsorbed on a cation exchanger and for this purpose a resin containing acid groups. such as Dowex–50, is especially suitable. This resin can be used either in the acid form or in the sodium form, though mixtures of these two forms have proved particularly useful. The elution is advantageously carried out with an acid agent, for example with methanolic hydrochloric acid or an acidic buffer solution.

(3) Furthermore, the ferrioxamines can be extracted from an aqueous solution thereof by means of an organic solvent. Higher organic alcohols, for example benyl alcohol or isopropanol, have proved particularly advantageously for this extraction process. It is of advantage in this connection to add to the aqueous phase an inorganic salt, for example ammonium sulfate or sodium chloride. From the resulting organic extracts the ferrioxamines can be obtained in an enriched form either by evaporating the solvent or by precipitating the product with a suitable organic solvent, for example ether, petroleum ether or ethyl acetate.

(4) The ferrioxamines can also be enriched by treating a concentrated aqueous or alcoholic-aqueous solution of the salt with an excess of an organic water-miscible solvent such as acetone, dioxane or the like, whereby the salts are precipitated in solid form.

(5) Another method of enriching the ferrioxamines consists in distributing them between an aqueous solution and a solution of phenol in chloroform, both the pH-value of the aqueous solution and the phenol content of the chloroform solution being varied. Taking as the coefficient of distribution of the ferrioxamines the ratio of their concentration in the organic phase to their concentration in the aqueous phase, it will be realized that the coefficient of distribution rises as the phenol content of the organic phase is increased, and is reduced as the pH of the aqueous phase is lowered. Since it is thus possible to establish any desired coefficient of distribution of the ferrioxamines in this system, a combination of a few distribution operations enables a large portion of inactive impurities to be removed.

(6) Another method of enriching the ferrioxamines is chromatography, such as adsorption chromatography on various materials, for example on Norit, alumina, magnesium silicates, silica gel or calcium sulfate, as well as partition chromatography using cellulose, starches, silica gel, Celite or the like as carrier substances, or chromatography on ion-exchanger resins such as Dowex-50, Amberlite IRC-50 and the like.

(7) Furthermore, the ferrioxamines can be enriched by counter-current distribution according to Craig between two immiscible solvent phases. For this purpose the following solvent systems have proved particularly advantageous:

(a) Benzyl alcohol-aqueous ammonium sulfate solution of 20% strength.
(b) 100 parts by volume of n-butanol, 200 parts by volume of benzyl alcohol, 6 parts by volume of N-hydrochloric acid, 300 parts by volume of water, 60 parts by volume of aqueous sodium chloride solution saturated at 19° C.

(8) Finally, the purification, enrichment and separation of ferrioxamine preparations can be performed by preparative electrophoresis on a column of carrier material. This process is advantageously carried out as a high-voltage electrophoresis at 500-4000 volts. A further improvement can be obtained by carrying out the electrophoresis according to the so-called counter-current principle, in which the basic ferrioxamines A, B, C and F, which are present as cations are locally anchored on the carrier column by accurately compensating their movement produced by the electric field with a current of electrolyte flowing in the opposite direction. In this way it is ensured that substances having a different electric mobility leave the carrier column at the ends of the two electrodes.

The individual ferrioxamines are obtained as pure and uniform substances in the form of amorphous powders or as crystals. For their preparation the following methods have proved to be useful:

Lyophilization of an aqueous or alcoholic solution,

Precipitation from an aqueous, alcoholic or phenolic solution with lipophilic organic solvents which are miscible with the solvent containing the ferrioxamine in question. Particularly suitable for this precipitation are lower alkyl ketones, such as acetone, methylethyl ketone, ethers, such as diethyl ether, diisobutylether, and hydrocarbon such as pentane, hexane, petroleum ether.

Crystallization from suitable solvent mixtures, such as alcohol-ether mixture, like methanol diethylether, or mixtures of water and organic solvents at least partially miscible with water, like water-acetone, water-glacial acetic acid and so on.

The ferrioxamines as well as their derivatives and their salts can be used for promoting the growth or various organisms, for which purpose they are used as such or in the form of special preparations containing the aforementioned compounds in admixture with a suitable vehicle.

They also possess marked anti-anaemic properties, which were demonstrated in the case of ferrioxamine B as follows in experimental animals:

(1) *Anti-Anaemic Effects*

In the normal rabbit, 10 mg./kg. s.c. daily for 5 days, corresponding to approximately 0.8 mg./kg. Fe···, produced no significant alterations in the haemoglobin level, in the erythrocyte and reticulocyte counts, or in the haematocrit. On the other hand, from the 3rd day onwards, a certain increase in the sedimentation rate as measured according to Westergren was observed, the figure rising from 20 mm. in 24 hours to approx. 30 mm., then on the 5th day to 40 mm., reverting to normal again from the 6th day onwards. This increase in the sedimentation rate was accompanied by a rise in the total serum proteins as measured electrophoretically, this rise affecting particularly the α and γ globulins; the total serum protein levels subsequently returned to normal parallel with the normalisation of the sedimentation rate.

(a) *Haemorrhagic anaemia.*—By contrast, in a group of 5 rabbits following haemorrhage involving a loss of blood equivalent to 2% of their body-weight, a considerable decrease in haemoglobin (down to approx. 7 g./100 ml.) was noted on the next day, followed by relatively slow restitution and virtual normalisation after 24 days. Parallel with this, a crisis affecting the reticulocytes was observed, which reached its maximum of 6% around the 9th day and was followed by more or less complete normalisation after 24 days. Under the same experimental conditions, a similar group of 5 rabbits which had received ferrioxamine B in daily doses of 10 mg./kg. s.c. for 24 days, starting from the day after the haemorrhage, showed a much more rapid rise in haemoglobin, the level of which became roughly normal again by the 18th day; in the animals thus treated, the crisis involving the reticulocytes also subsided on the 3rd day. The results obtained in these experiments are listed in Table 6.

TABLE 6

| Days | Haemolgobin | | Reticulocytes | |
| --- | --- | --- | --- | --- |
| | Controls | Ferrioxamine B, 10 mg./kg. S.C. | Controls | Ferrioxamine B, 10 mg./kg. S.C. |
| 0 Haemorrhage (2% of the animal's body-weight) | 12 | 12 | 22 | 22 |
| 1 | 7.2 | 8.0 | 37 | 37 |
| 3 | 8.2 | 8.8 | 44 | 48 |
| 6 | 8.7 | 9.1 | 58 | 42 |
| 9 | 8.7 | 9.0 | 62 | 37 |
| 12 | 9.1 | 10.0 | 56 | 29 |
| 15 | 9.3 | 10.3 | 43 | 25 |
| 18 | 10.6 | 12 | 34 | 25 |
| 21 | 10.8 | 12.5 | 30 | 23 |
| 24 | 12.2 | 12.8 | 27 | 21 |

In another series of tests, a more severe haemorrhage was produced by first removing blood equivalent to 2% of the animal's weight and then, 3 days later, removing the equivalent of a further 1%. Under these conditions, a group of 5 rabbits showed a fall in haemoglobin to 7.5-8 g./100 ml., which reached its maximum 1 day after the second haemorrhage, persisted until about the 9th day, and reverted roughly to normal on the 27th day. At the same time, a reticulocyte crisis was noted, which gradually reached its maximum by the 9th day (reticulocytes 6.9%) and then slowly subsided until at the end of the test the reticulocyte count had reverted to normal. A parallel group of 5 comparable rabbits, having received ferrioxamine B in daily doses of 10 mg./kg. s.c. for 27 days, showed a much less pronounced fall in haemoglobin and a much more rapid recovery. At the same time, the reticulocyte crisis attained a maximum of barely 4% between the 3rd and 6th day, normalisation supervening towards the 18th day. These results are listed in Table 7.

TABLE 7

| Days | Haemoglobin, g./100 ml. | | Reticulocytes, percent | |
|---|---|---|---|---|
| | Controls | Ferrioxamine B, 10 mg./kg. s.c. | Controls | Ferrioxamine B, 10 mg./kg. s.c. |
| 0 Haemorrhage (2% of the animal's body-weight) | 12.4 | 12.2 | 2.3 | 2.1 |
| 1 | 8.7 | 8.6 | 2.9 | 3.3 |
| 3 Haemorrhage (1% of the animal's body-weight) | 8.4 | 9.3 | 4.3 | 3.9 |
| 4 | 7.5 | 8.9 | 5.2 | 3.9 |
| 6 | 8.0 | 8.9 | 6.0 | 3.5 |
| 9 | 8.5 | 9.5 | 6.9 | 3.1 |
| 12 | 9.4 | 10 | 5.9 | 2.9 |
| 15 | 9.2 | 10.6 | 4.8 | 2.6 |
| 18 | 10.7 | 11 | 4.5 | 2.1 |
| 21 | 11.2 | 11 | 3.6 | 2 |
| 24 | 12 | 12 | 3 | 2 |
| 27 | 12.2 | 12.5 | 2.5 | 2 |

It follows from these experiments that, in daily doses of 10 mg./kg. s.c., ferrioxamine B exerts a specific anti-anaemic effect in experimentally induced haemorrhagic anaemia, as the result of which the haemoglobin level reverts more rapidly to normal and the reticulocyte crisis is considerably attenuated.

(b) *Iron-deficiency anaemia in rats.*—A group of 10 to 15 young rats weighing approx. 40 g. and receiving a diet consisting exclusively of cow's milk and semolina, according to the method of D. L. Drabkin and H. K. Miller (J. Biol. Chem. 93, 39, 1931) and E. Rothlin and E. Undritz (Helv. med. Acta, Series A, 460, 1946), developed—in addition to slightly retarded growth—an iron-deficiency anaemia with a fall in haemoglobin to approx. 7 g./100 ml., accompanied by no significant change in the erythrocyte count but by a decrease in the haemoglobin erythrocyte index reaching its maximum after 36-60 days. The reticulocyte crisis attained its maximum after 60 days. Parallel groups of animals which received ferrioxamine B in daily doses of 10 mg./kg. s.c. or p.o. starting from the 60th day showed a considerable rise in haemoglobin, the level of which reverted almost to normal after 70-80 days; there was little effect on the erythrocyte count, but the haemoglobin index approached normal figures, and the reticulocyte crisis was less marked than in the controls. The results obtained in these experiments are listed in Table 8.

These results show that, in daily doses of 10 mg./kg. s.c. and p.o., ferrioxamine B was able to exert a specific influence on this form of iron-deficiency anaemia, rectifying the haemoglobin level, normalising the erythrocyte index, and attenuating the reticulocyte crisis.

(c) *Bartonella muris anaemia in rats.*—In adult rats suffering from latent infection with Bartonella muris, splenectomy—performed according to the method of J. Marmorston-Gottesman and D. Perla (J. exp. Med. 52, 121, 131, 1930) and D. Weinmann (J. Infect. Dis. 63, 1, 1938)—led to acute anaemia which often proved fatal. This anaemia was characterised by a considerable diminution in the erythrocyte count, a fall in the haemoglobin level, and an intense reticulocyte crisis of approx. 10%, these manifestations attaining their maximum degree roughly 6 days after splenectomy. Similar groups of 10 rats which had received ferrioxamine B in daily doses of 10 mg./kg. s.c. or p.o. showed a decidedly smaller decrease in the erythrocyte count and in the haemoglobin level as well as a far less severe reticulocyte crisis, which for example was even suppressed after 10 mg./kg. p.o. The results thus obtained are summarised in Table 9, showing that ferrioxamine B is also capable of exerting its specific anti-anaemic properties in this type of experimental anaemia.

TABLE 9

| Days | Erythrocytes, millions/ml. | | | Haemoglobin, g./100 ml. | | | Reticulocytes | | |
|---|---|---|---|---|---|---|---|---|---|
| | Controls | Ferrioxamine B, 10 mg./kg. | | Controls | Ferrioxamine B, 10 mg./kg. | | Controls | Ferrioxamine B, 10 mg./kg. | |
| | | s.c. | p.o. | | s.c. | p.o. | | s.c. | p.o. |
| 0 Splenectomy | 6.69 | 7.18 | 7.52 | 13.8 | 13.2 | 14.7 | 26 | 28 | 21 |
| 3 | 6.76 | 7.21 | 6.83 | 12.8 | 12.7 | 13.2 | 44 | 32 | 28 |
| 6 | 5.85 | 7.00 | 6.56 | 12.3 | 12.4 | 12.7 | 102 | 42 | 31 |
| 9 | 5.78 | 7.05 | 6.71 | 11.2 | 12.7 | 12.6 | 88 | 46 | 31 |
| 12 | 6.06 | 6.87 | 7.10 | 11.7 | 12.6 | 13.4 | 68 | 67 | 29 |

(2) *Other Pharmacological Properties*

Ferrioxamine B has a meager spectrum of pharmacological properties: given in doses of up to 100 mg./kg. i.v., it causes no fall in arterial blood pressure and has no influence on respiration in rabbits anaesthetized with urethane (1.4 g./kg. s.c.). On isolated organs, such as the rabbit or guinea-pig intestine, the seminal vesicle of the guinea-pig, and the vessels of the rabbit hindquarters, it is inactive in concentrations of up to $100\gamma$/ml., at which concentrations it also has no specific anticholinergic, musculotropic, adrenolytic, or histaminolytic effects on the appropriate isolated organs. As a "growth factor," ferrioxamine B promoted the proliferation of various micro-organisms, such as *B. subtilis, Staphylococcus aureus, Candida vulgaris, Ustilago sphaerogena,* and *Chlamydomonas eugametos* (H. Bickel, E. Gäumann, W. Keller-Schierlein, V. Prelog, E. Vischer, A. Wettstein, and H. Zähner: Experientia 16, 129, 1960), in concentra-

TABLE 8

| Days | Haemoglobin, g./100 ml. | | Erythrocytes, millions/cu. mm. | | Index, $\mu\gamma$-Hb/erythrocyte | | Reticulocytes, Percent | |
|---|---|---|---|---|---|---|---|---|
| 1 | 10.7 | 10.7 | 4.76 | 4.76 | 22.5 | 22.5 | 4.7 | 4.7 |
| 30 | 8.0 | 7.6 | 6.44 | 5.90 | 12.4 | 12.9 | 3.2 | 3.5 |
| 60 | 7.0 | 6.4 | 7.62 | 6.42 | 9.2 | 10.0 | 3.6 | 4.2 |
| | Controls | Ferrioxamine B, 10 mg./kg. daily p.o. | Controls | Ferrioxamine B, 10 mg./kg. daily p.o. | Controls | Ferrioxamine B, 10 mg./kg. daily p.o. | Controls | Ferrioxamine B, 10 mg./kg. daily p.o. |
| 67 | 6.8 | 8.9 | 6.72 | 7.12 | 10.1 | 12.5 | 4.4 | 4.2 |
| 74 | 6.8 | 10.1 | 7.23 | 7.08 | 9.4 | 14.3 | 4.7 | 4.1 |
| 81 | 7.0 | 11.3 | 6.85 | 6.88 | 10.2 | 16.4 | 4.5 | 3.6 |
| 88 | 7.0 | 11.8 | 6.84 | 7.13 | 10.2 | 16.5 | 4.3 | 3.0 | tions of 0.1γ/ml. and above. In concentrations ranging up to 100γ/ml. it has no bacteriostatic effect in vitro on any of a whole series of gram-positive and gram-negative bacteria, nor did it display any activity against various fungi in concentrations up to the very high level of 100–1,000γ/ml.; it also showed no chemotherapeutic effects in doses of up to 500 mg./kg. s.c. administered 5 times in 30 hours, affording no protection to groups of 10 mice suffering from a lethal *Staphylococcus aureus* or *Streptococcus haemolyticus* infection.

(3) *Toxicology*

The toxicity of ferrioxamine B is very low, the $LD_{50}$ (= amount required to kill 50% of the animals) for a single dose being 950 mg./kg. i.v. and 2,500 mg./kg. p.o. in mice and 500 mg./kg. s.c. in rats. In mice and rats, sublethal doses provoke signs of intoxication in the form of ataxia and non-specific paralysis interrupted by mild convulsions.

In sub-acute toxicity tests, ferrioxamine B was administered to groups of 12 rats for 28 days in daily doses of 1,000 mg./kg. s.c. None of the animals died during the tests. The weight of the animals thus treated increased from 118 to 222 g. and that of the controls from 113 to 214 g.; hence, the rate of growth remained perfectly normal. At the same time, a regular check was kept on the red and white blood counts: no pathological changes in the blood such as might have been ascribed to the repeated administration of ferrioxamine B were found. At the end of the experiment, examination of the main organs, such as the heart, lungs, stomach, intestine, liver, kidneys, spleen, thymus, lymph nodes, thyroid, and testicles, showed that there had been no alteration in weight and that no pathological lesions attributable to repeated treatment with ferrioxamine B had occurred.

The acute local tolerability of ferrioxamine B was good; not until a concentration of 30% was reached did slight transient hyperaemia develop when the product was instilled into the conjunctival sac of rabbits.

(4) *Summary and conclusion*

Ferrioxamine B displays specific anti-anaemic properties and low toxicity in experimental animals; it may therefore be considered for medicamentous use in the treatment of anaemia in daily parenteral doses of 100 mg. or fractions of the latter.

Suitable vehicles for preparations are substances that do not react with the ferrioxamines such, for example, as gelatine, lactose, starches, magnesium stearate, talc, vegetable oils, benzyl alcohols, gums, polyalkylene, white petroleum jelly or cholesterol. Such preparations may be in solid form, for example powders, or, in liquid form, solutions, suspensions or emulsions. They may be sterilized and/or may contain additives such as preserving, stabilizing, wetting agents or emulsifiers. They may further contain other therapeutically useful substances.

FIG. 1 shows a counter current distribution of crude ferrioxamine in the system n-butanol–bendyl alcohol–water-saturated aqueous sodium chloride solution–N-hydrochloric acid (100:200:300:60:6) over 80 stages each of 100 ccm. of organic phase and 100 ccm. of aqueous phase –.–.–.–. Extinction at 425 mμ

Antisideromycin-activity in mm. (modified Bonifas-test).

FIG. 8 shows a chromatogram of fractions 2–5 obtained by chromatography of fraction V of FIG. 1 on Dowew 50–WX₂ using ammonium acetate buffer as eluting agent in both instances –.–.–. Extinction at 425 mμ.

FIG. 9 shows a chromatogram of fraction 48–55 obtained by chromatography of fraction V of FIG. 1 on Dowex 50–WX₂ using ammonium acetate buffer as eluting agent in both cases –.–.–. Extinction at 425 mμ.

EXAMPLE 1

Figure 1:
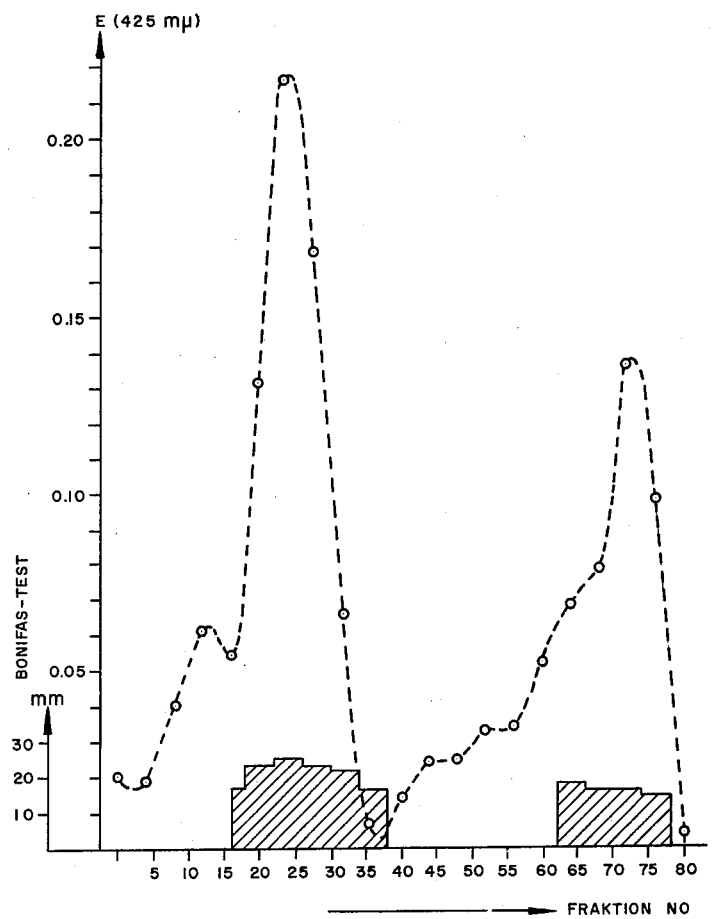

*Streptomyces pilosus* strain NRRL 2857 is grown submerged on a nutrient solution containing per liter of tap water 20 grams of soybean flour and 20 grams of mannitol. The nutrient solution is sterilized in the inoculation flasks or in the fermenters for 20–30 minutes under a pressure of 1 atmosphere gauge. The pH-value of the sterilized nutrient solution is 7.2–7.6. For the inoculation up to 20% of a partially sporulating vegetative culture of the aforementioned organism is used. Incubation is carried out with vigorous shaking or stirring at 24–30° C., cultures in fermenters being aerated with about 2 volumes of air per volume of solution per minute. After an incubation period of 48–240 hours the culture solution displays its maximum content of ferrioxamines. The cultivation is discontinued, 0.1% of ferric chloride is added, and the mycelium together with other solid constituents is separated from the solution containing the bulk of ferrioxamines by filtration or centrifugation; if desired about 1% of a filter aid, for example Hyflo-Supercel, is added to the culture solution prior to filtration. The filter residues are washed with water or aqueous methanol an dthe washings are combined with the culture filtrate. While stirring it continuously the resulting culture filtrate is treated with 2% of alumina, for example Frankonit. The mixture is thoroughly mixed and filtered and the resulting filtrate is subjected once or twice more to the absorption operation. The filter residues are combined and washed repeatedly with water and aqueous methanol and then eluted twice or three times with a 1:4-mixture of pyridine and water. The eluate is clarified by filtration and then concentrated in vacuo. The resulting concentrates can be further worked up as they are (see Example 3), or a mixture of ferrioxamines in crude form can be isolated therefrom by means of freeze-drying.

When the nutrient solution described above is replaced by one which contains per liter of tap water the following ingredients, and cultivation and working up are carried out in a similar manner concentrates of a similarly high ferrioxamine content are obtained:

(a) Saccharose _____ g__ 20
    Sodium citrate _____ g__ 0.9
    Ammonium acetate _____ g__ 3
    Secondary potassium phosphate _____ g__ 3
    Magnesium sulfate _____ g__ 0.8
    Copper sulfate _____ mg__ 0.01
    Manganese chloride _____ mg__ 0.07
    Ferric citrate _____ mg__ 20

(b) Crude glucose _____ g__ 10
    Soybean flour _____ g__ 10
    Corn steep liquor _____ g__ 20
    Sodium chloride _____ g__ 5
    Sodium nitrate _____ g__ 1
    Lime _____ g__ 10

(c) Rape extraction shucks _____ g__ 20
    Crude glucose _____ g__ 10
    Secondary potassium phosphate _____ g__ 0.2
    Lime _____ g__ 10

(d) Flax meal _____ g__ 40
    Crude glucose _____ g__ 10
    Secondary potassium phosphate _____ g__ 0.2
    Lime _____ g__ 10

Instead of the aforementioned strain of the species *Streptomyces pilosus* the following strains can be used, which are kept under the specified strain numbers at the Institute for Special Botany, Eidgenossische Technische Hochschule, Zurich. Analogous cultivation and working up yields culture filtrates having a similarly high content of ferrioxamine.

| Strain No. | Streptomyces species |
|---|---|
| 9578 | *S. griseoflavus* (Krainsky) Waksman et Henrici. |
| 15311 | *S. griseoflavus*. |
| 11686 | *S. pilosus* Ettlinger et al. |
| 23258 | *S. pilosus*. |
| 23305 | *S. pilosus*. |
| 17635 | *S. viridochromogenes* (Krainsky) Waksman et Henrici. |
| 18055 | *S. viridochromogenes*. |
| 6445 | *S. olivaceus* (Waksman) Waksman et Henrici. |
| 7346 | *S. olivaceus*. |
| 7437 | *S. olivaceus*. |
| 22083 | *S. aureofaciens* Duggar. |
| 22765 | *S. aureofaciens*. |
| 18822 | *S. galilaeus* Ettlinger et al. |
| 14677 | *S. lavendulae* (Waksman et Curtis) Waksman et Henrici. |
| 21510 | *S. lavendulae*. |
| 21837 | *S. polychromogenus* Hagemann et al. |
| 23217 | *S. ploychromogenus*. |
| 23310 | *S. polychromogenus*. |
| 1012 | *S. griseus* Waksman et Henrici. |
| 13495 | *S. griseus*. |
| 7419 | *S. griseus*. |

EXAMPLE 2

Strain A-23978 of the species *Streptomyces aureofaciens* (Institute for Special Botany, Eidgenossische Technische Hochschule, Zurich) is grown as a submerged culture on a nutrient solution containing per liter of tap water. 20 grams of malt extract and 20 grams of distillers' solubles. Cultivation and working up according to Example 1 yields culture filtrates having a similarly high content of ferrioxamines.

EXAMPLE 3

A culture of 60 liters is prepared and worked up as described in Example 1. The eluate (about 6 liters) obtained with a mixture of pyridine and water is concentrated in vacuo to 3 liters. 870 grams of ammonium sulfate are dissolved in this concentrate and the solution is clarified by filtration or centrifugation, if necessary with the addition of 1% of Hyflo-Supercel. By shaking the solution 3 to 4 times with benzyl alcohol or isopropanol, the ferrioxamines are transferred into the organic solvent. The organic phases are combined and dried with the aid of sodium sulfate. An excess of ether or ethyl acetate is added and the precipitated ferrioxamines are filtered off. Addition of a filter aid, for example Hyflo-Supercel, prior to the precipitation facilitates the isolation of the precipitate, from which the ferrioxamines can be washed out with methanol or water. These eluates are evaporated or lyophilized to yield a preparation of ferrioxamines in enriched form.

EXAMPLE 4

20 grams of sodium chloride per liter are added to a culture filtrate obtained according to example 1 or 2. The clear solution is extracted three times with 0.1 volume of a mixture containing 1 part by weight of phenol in 1 part by volume of chloroform. The organic phases are combined, filtered in the presence of Hyflo-Supercel, and treated with an excess of ether. When the solution is shaken repeatedly with a small amount of water, the ferrioxamines are transferred into the aqueous phases which are then combined and shaken twice with ether to remove the phenol completely. By freeze-drying an orange to brownish red preparation of ferrioxamines is obtained which can be separated by paper chromatography.

EXAMPLE 5

20 liters of culture solution are treated with 400 grams of Hyflo-Supercel and 200 cc. of an aqueous ferric sulfate solution of 10% strength, and filtered. After adding 3.6 kg. of sodium chloride, the filtrate is extracted in a counter current extractor with 2 liters of a mixture of phenol and chloroform (1 g.: 1 cc.), the extract dried over sodium sulfate and then allowed to run in the course of one hour into a well stirred suspension of 20 grams of Hyflo-Supercel in 2 liters of ether and 10 liters of petroleum ether. After filtering the powdery mixture of filter aid and precipitate, the filtrate is washed with about 2 liters of ether and then eluted 5 times with 600 cc. of methanol on each occasion. The combined eluates are gently evaporated to yield 10 grams of crude ferrioxamine in the form of a brown red powder.

EXAMPLE 6

4 grams of ferrioxamine are distributed in the system n-butanol-benzyl alcohol-water-saturated aqueous sodium chloride solution-N-hydrochloric acid (100:200:300:60:6) over 80 stages each of 100 cc. of organic phase and 100 cc. of aqueous phase. Evaluation of the distribution is carried out by biological testing and by measuring the extinction at 425 m$\mu$: of each fourth unit 2 cc. of upper and lower phase is taken and mixed with 32 cc. of methanol, a homogeneous solution being obtained whose concentration is suitable for both tests (cf. FIG. 1). The distribution fractions, put together in 4 groups according to this evaluation, contain, as shown by paper chromatography, in addition to the chief product ferrioxamide B (in distribution fraction III), other red-colored compounds having an antisideromycin activity and which are designated as ferrioxamines A, C, $D_1$, $D_2$, E and F.

| Fraction No. | Distribution fraction | Principal ferrioxamine |
|---|---|---|
| 6–18 | II | A. |
| 19–32 | III | B. |
| 33–62 | IV | C. |
| 63–80 | V | $D_1$, $D_2$, E and F. |

The distribution fraction III is agitated with 3 liters of petroleum ether. The deep red-colored aqueous phase is washed with chloroform, treated with sodium chloride up to a concentration of 10% and extracted exhaustively with a mixture of phenol and chloroform (1 g:1 cc.). The phenol-chloroform extract is washed several times with 0.01 N-hydrochloric acid containing 10% of sodium chloride and filtered through a small column of 20 grams of Celite. The ingredients are precipitated by the addition of 25 grams of Hyflo-Supercel, 500 cc. of ether and 1 liter of petroleum ether with stirring at 0° C. The powdery mixture of filter aid and precipitate is washed well with ether and then eluted with a little methanol.

From the methanol eluate there are obtained on gentle evaporation 982 mg. of crude ferrioxamine B in the form of a brown-red powder.

The distribution fraction II, IV and V are worked up in the same manner.

EXAMPLE 7

Figure 3:
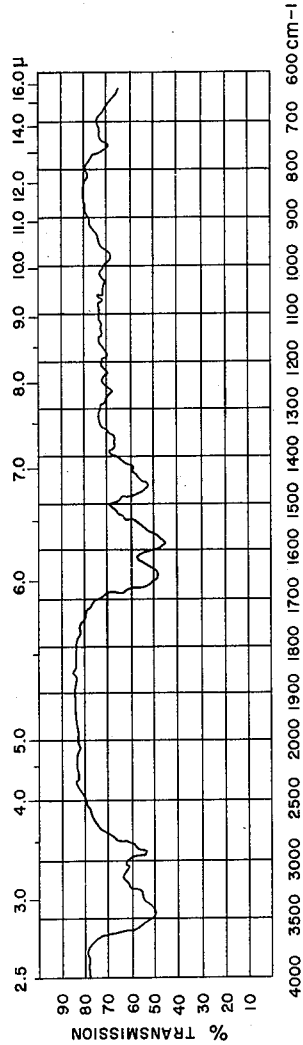
FIG. 3 shows the infra-red spectrum of ferrioxamine B in heavy paraffine oil.

1 gram of a preparation of ferrioxamine B prepared as described in Example 6 is subjected to zone electrophoresis according to J. Porath (Biochem, et Biophys. Acta 22, page 151 (1956) in a vertical glass column of 1.5 meters height and 2.6 centimeters diameter equipped with a cooling jacket and filled with cellulose powder. Electrolyte solution: ⅓ N-acetic acid. The substance is dissolved in 20 cc. of water and the deep red solution is poured over the column from the top end of the anode. At a voltage of 1600 volts and a current intensity of 30 milliamperes the orange red ferrioxamine zone (about 10 cm. high) migrates at a rate of 3.9 cm per hour towards the cathode at the bottom end of the column. To increase the separating action of the column this electric migration is compensated by a flow of electrolyte in the opposite direction, whereby the active principle, which is easy to identify by its characteristic color, is locally anchored in the column. In this operation accompanying substances having a greater or smaller electric mobility than the active principle are transferred into the cathode or anode chamber respectively and removed from the column. Under these conditions the active principle travels within 5 to 6 days through a liquid column of 4 to 5 meters length. The electrophoresis is then discontinued and the column is eluted with ⅓ N-acetic acid, fractions of 15 cc. each being collected and individually tested. The dark red, biologically active fractions are combined. 10% of sodium chloride is added and the solutions are exhaustively extracted with a mixture of 1 part by weight of phenol in 1 part by volume of chloroform. The combined extracts are repeatedly washed with 0.01 N-hydrochloric acid containing 10% of sodium chloride and then filtered through Celite. A filter aid (Hyflo-Supercel) is added to the deep red, anhydrous filtrate which is then treated, while being stirred, with 5 times its volume of a 1:1-mixture of ether and petroleum ether, whereby the active principle is precipitated on to the filter aid. The latter is filtered off and copiously washed with ether. The active substance is then eluted with a small amount of methanol and the red solution is evaporated to dryness in vacuo at 20° C. The preparation of ferrioxamine B obtained in this manner contains twice as much active principle per weight as did the starting material; it forms a red amorphous powder which is soluble in water, methanol, butanol, benzyl alcohol, phenol, dimethyl formamide and acetic acid and contains carbon, hydrogen, oxygen, nitrogen and iron. Its other properties are as follows: pk - value (66% aqueous methyl Cellosolve)=9.54; equivalent weight=645; ultra-violet absorption maximum at $$430 \text{ m}\mu \text{ (log } \epsilon_{1\text{ cm.}}^{1\%} = 1.51)$$

infra-red spectrum: see FIG. 3.

By hydrolysing such a preparation in 6 N-hydrochloric acid for 6 hours at 110° C. a mixture is obtained which contains 5 ninhydrin-positive substances which display the following $R_f$-values in paper-chromatography:

| Substance No. | Solvent Mixture | |
|---|---|---|
| | Phenol +water (8:2) | n-butanol +glacial acetic acid+water (4:1:1) |
| 1 | 0.68 | 0.37 |
| 2 | 0.40 | 0.34 |
| 3 | 0.35 | 0.10 |
| 4 | 0.30 | 0.05 |
| 5 | 0.20 | 0.04 |

EXAMPLE 8

Figure 2:
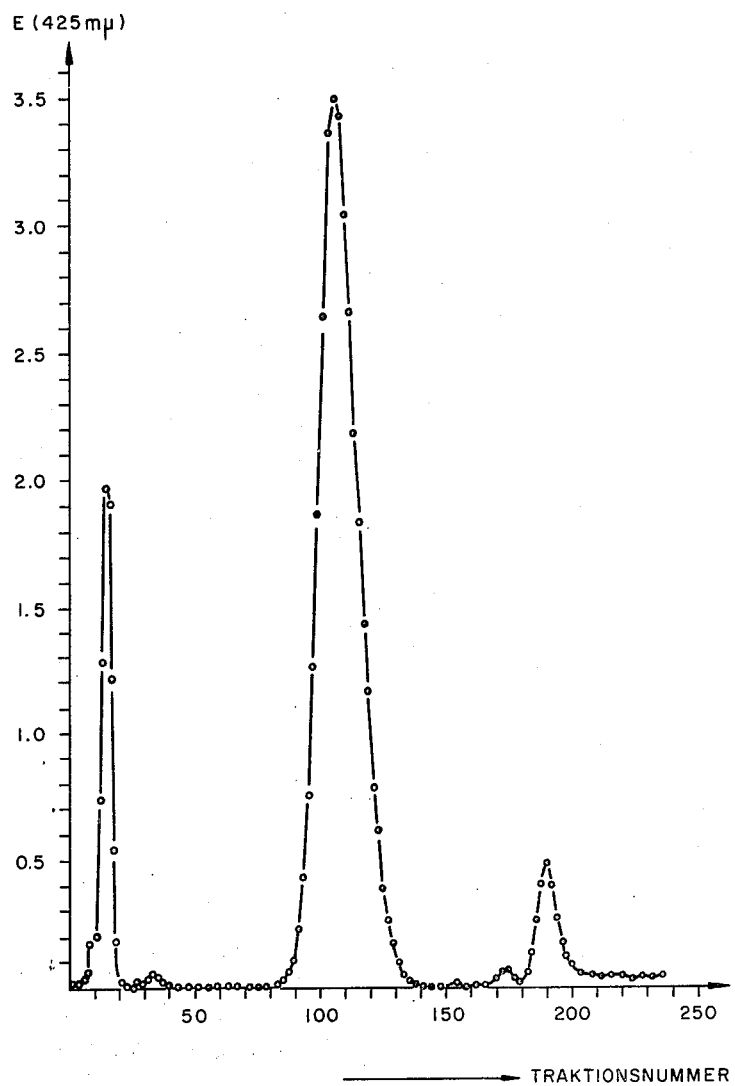
FIG. 2 shows a chromatogram of fraction III of FIG. 1 on Dowex 50–WX₂ using an ammonium acetate, buffer as eluting agent –.–.–. Extinction at 425 mμ.

865 mg. of crude ferrioxamine B from distribution fraction III (cf. Example 6) are chromatographed at 15–17° C. on a column (66 cm. × 7.14 cm.²) of Dowex 50–WX₂ (100/200 mesh). The ion exchanger is purified previously as described by Hirs et al, J. Biol. Chem. 219, page 623 (1956), converted into the ammonium form and brought on to the glass column by sedimentation. It is equilibrated with an 0.2-molar ammonium acetate buffer solution of pH 4.60 for 48 hours at a percolation rate of 200 cc. per hour. The substance is poured on to the column in 9 cc. of the above buffer solution and then developed with 0.2-molar buffer of pH 4.6 for 72 hours at a percolation rate of 100 cc. per hour. The elution medium is then continuously concentrated (gradient elution) using a mixing vessel of 1 liter capacity and 2-molar ammonium acetate buffer solution of pH 4.7. The eluate is collected in fractions of 40 cc. each shortly before the first colored zone is leaving the column. The fractions are combined according to their extinction at 425 m$\mu$ (see FIG. 2) and are then extracted in the above described manner using phenol-chloroform, ether-petroleum ether-Hyflo-Supercel and methanol, as described in Examples 6 and 7.

| Fraction | Quantity in mg. | Substance |
|---|---|---|
| 13–18 | 62 | Unidentified. |
| 93–125 | 544 | Ferrioxamine N hydrochloride. |
| 185–197 | 36 | Unidentified. |

Ferrioxamine B hydrochloride is soluble in water, methanol, alcohol, phenol, dimethylformamide and glacial acetic acid, sparingly soluble in butanol and practically insoluble in chloroform, acetone, ether and ethyl acetate. Micro-analysis after 48 hours at 20° C. under 0.001 mm. of pressure: C 48.04%, H 77.41%, N 11.21%, Cl 5.25%, P 0%, Fe 7.67%. Titration:

$$pK_{\text{MCS}} = 9.74$$

equivalent weight 704. Absorption (H₂O):

$$\lambda \text{ max. } 430 \text{ m}\mu, E_{1\text{ cm.}}^{1\%} = 39.0$$

Infrared spectrum in heavy paraffin oil, see FIG. 3, $R_f$-value in system I 0.44, in system V 0.29 (Table I). Partition coefficient in system VI 0.228 (Table I).

Ferrioxamine B gives a positive color reaction with ninhydrin. It is readily oxidized with ferric chloride-potassium ferric cyanide reagent (G. M. Barton et al., Nature 170, 249 (1952)). In the other hand, it can be reduced with sodium dithionite with decoloration. The colorless solutions obtained recover their original red color rapidly when allowed to stand in the air. The iron bound in ferrioxamine B is removed from the complex when subjected to the action of a mineral acid or a strong alkali.

Iron-free ferrioxamine B (desferrioxamine B) is colorless. It can be transformed back to ferrioxamine B with ferric chloride. Desferrioxamine B reacts also with other metal ions with formation of the corresponding metal complexes, for example the greenish colored copper desferrioxamine.

EXAMPLE 9

20 mg. of a preparation of ferrioxamine B obtained as described in Example 8 are dissolved in 3 cc. of 1.2 N-hydrochloric acid and heated for 5 minutes on a boiling water bath. The initially reddish brown solution loses its color almost completely. It is evaporated to dryness in vacuo and the residue is dissolved in 0.2 cc. of water. 0.01 cc. each of this solution is used for the following paper-chromatographic examination. The solvent system used is a mixture of 7 parts by volume of n-butanol and 3 parts by volume of 6 N-hydrochloric acid. The following substances were identified:

| Substance | $R_f$ | a | b | c | d |
|---|---|---|---|---|---|
| Cadaverine | 0.12 | | Grey violet | | |
| $Fe^{++}$ | 0.17 | Pale yellow | | Deep red | |
| 1-amino-5-hydroxyl-amino pentane | 0.25 | | Grey violet | do | |
| Hydroxylamine | 0.34 | | | Pale red | Violettish red. |
| Unknown substance | 0.68 | | Bluish | | |
| $Fe^{+++}$ | 0.84 | Yellow | | | |
| Unknown substance | 0.93 | | | Red | |

In the above table (a) signifies the characteristic colors of the substances recognisable on the papers, (b) color reaction with ninhydrin, (c) color reaction with triphenyl tetrazolium chloride+sodium hydroxide solution, and (d) color reaction with the Czaki reagent. (All reagents as described in "Handbuch der Papierschromatographie" by I. M. Hais and K. Macek, publishers Gustav Fischer, Jena, 1958.)

When instead of hydrochloric acid the hydrolysis is performed with hydriodic acid of 57% strength for 4 hours at 110° C., hydroxylamine, 1-amino-5-hydroxyl-amino-pentane and $Fe^{+++}$ are absent from the paper chromatogram, but more cadaverine and $Fe^{++}$ are found.

A second test portion of ferrioxamine B is hydrolyzed with 1.2 N-hydrochloric acid in the manner described above. The hydrolysis mixture is then extracted with ether. The extract is dried with sodium sulfate and evaporated. Succinic acid in crystalline form can be obtained from the residue.

EXAMPLE 10

An aqueous solution of 450 mg. of a ferrioxamine B preparation obtained as described in Example 8 and 450 mg. of sodium bicarbonate is treated with a solution of 450 mg. of 2:4-dinitrofluorobenzene in 26 cc. of ethanol. The mixture is kept for 4 hours at room temperature and the alcohol is than evaporated in vacuo. The excess reagent is removed by shaking with ether. The deep reddish brown dinitrophenyl-ferrioxamine B is then easy to extract with n-butanol (ferrioxamine B itself remains under the same conditions in the aqueous phase). The butanolic extract is washed with water dried and evaporated in vacuo. The residue is extracted with acetone and the insoluble brown residue (114 mg.) is filtered off. The acetone solution is then concentrated to about 5 cc., whereupon the dinitrophenyl-ferrioxamine B is precipitated as an amorphous orange -red powder. Yield: 338 mg.

On being subjected to paper-electrophoresis in dilute acetic acid the dinitrophenyl derivative migrates at 1000 volts in 2 hours a distance of 5.5 cm., while ferrioxamine B under identical conditions covers 18.5 cm.

EXAMPLE 11

For the isolation of the ferrioxaines A, C, $D_1$, $D_2$, E and F the distribution fractions II, IV and V (see Example 6) obtained in the counter-current distribution of crude ferrioxamine are chromatographed on Dowex 50–$WX_2$ (200/400 mesh) with an ammonium acetate buffer as eluting agent. The resin is previously purified by the method described by Hirs et al. (C. H. W. Hirs, S. Moore, W. H. Stein, J. Biol. Chem. 219, 623 (1956)). It is converted into the ammonium form and put into the glass column by sedimentation. It is equilibrated for about 70 hours with the buffer solution used for the elution at a percolation rate of 20 cc. per hour and per sq. cm. before the substance is poured on the column. The substances are poured on the column in 1–10% solution depending on their solubility, and the chromatograms are developed at 23–25° C. at a percolation rate of 5–15 cc. per hour and per sq. cm. with an ammonium acetate buffer of pH 4.5 in increasing concentration (of gradient elution). The chromatograms are evaluated by measuring the extinction of the eluate fractions (30–40 cc.) at 425 m$\mu$. The correspondingly collected eluate fractions are extracted exhaustively with a mixture of phenol and chloroform (1 g.:1 cc.) after the addition of 10% of sodium chloride. The deep red-colored extracts are washed thoroughly with 0.01 N-hydrochloric acid containing 10% of sodium chloride, filtered through a layer of Celite and the ingredients precipitated from the clear filtrates by the addition of ether and petroleum ether on to Hyflo-Supercel. The mixture of substance and carrier is washed with ether to remove the phenol and then eluted with a little methanol. From the methanol eluates the ferrioxamines are obtained by gentle evaporation in the form of brown-red hygroscopic powder which is dried over phosphorus pentoxide for 50 hours at 25° C under 0.03 mm. of pressure for the purpose of analysis.

Figure 6:
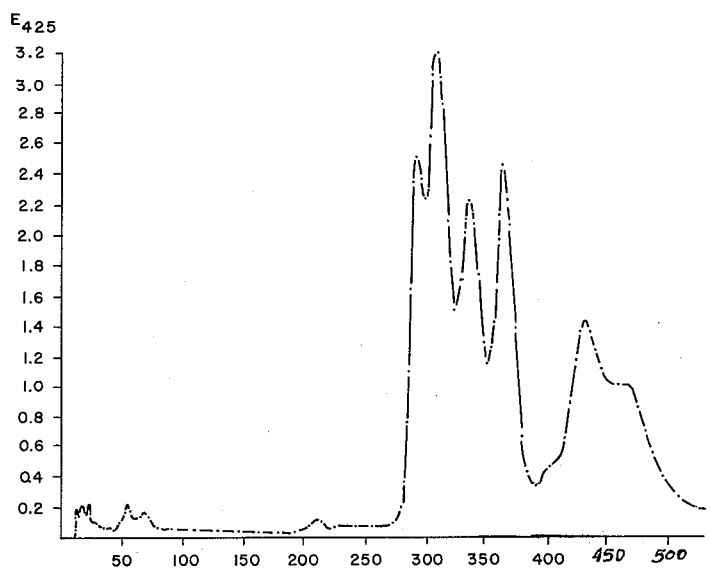
FIG. 6 shows a chromatogram of fraction II of FIG. 1 on Dowex 50–WX₂ using an ammonium acetate buffer as eluting agent –.–.–.–. Extinction at 425 mμ.
Figure 10:
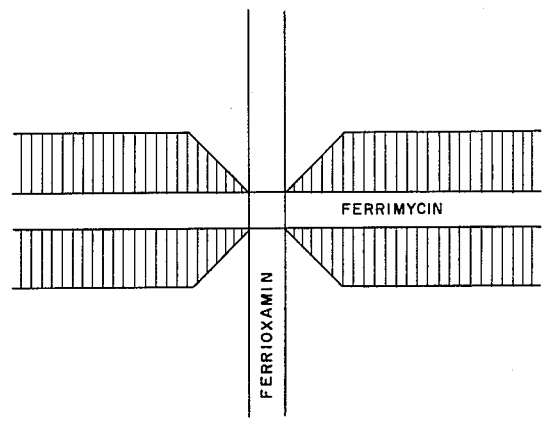
FIG. 10 shows the antagonism between ferrioxamines and ferrimycin in the modified Bonifas-test. The hatched area indicates inhibition of the growth of the test organism.

5 grams of fraction II (see Example 6) are chromatographed on a Dowex 50–$WX_2$ column of 90 cm. x 22 sq. cm. by the procedure described above (FIG. 6). Buffer solution at the beginning: 0.1-molar ammonium acetate pH 4.5. Percolation speed: 110 cc. per hour. Volumes of the eluate fractions: 35–40 cc. Switch over to gradient elution with a mixing vessel of 4 liters capacity and 1.75-molar ammonium acetate buffer of pH 4.70 at fraction No. 90.

| Fraction No. | Weight in mg. | Substances |
|---|---|---|
| 283–330 | 302 | Ferrioxamine A hydrochloride. |
| 301–325 | 488 | Ferrioxamine B+A hydrochloride. |
| 326–352 | 393 | |
| 353–385 | 452 | Not closely characterized substances. |
| 416–445 | 415 | |

Figure 5:
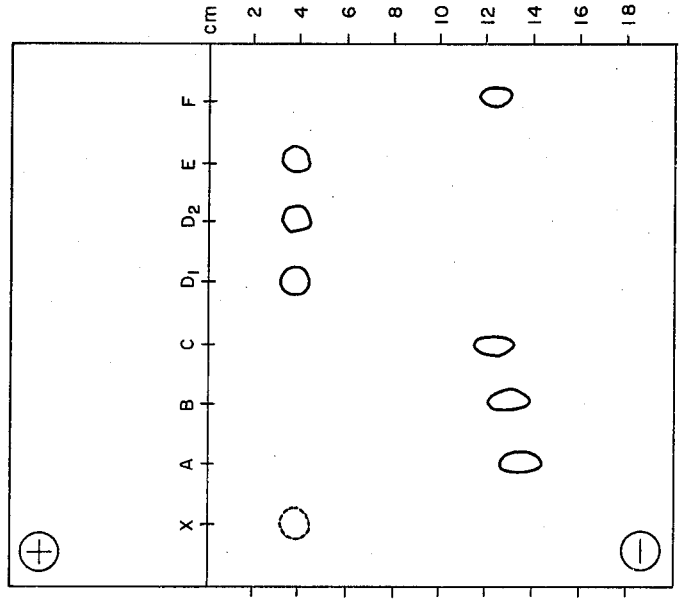
FIG. 5 shows paperelectrophoresis of the ferrioxamines, cm. path in 0.33 N acetic acid after 4½ hours at 220 v. In comparison fructose travels 3.9 cm.
Figure 4:
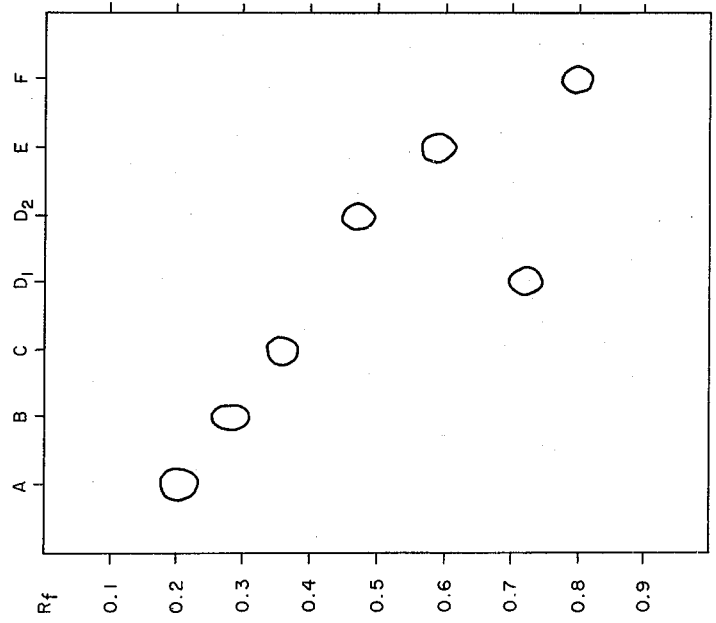
FIG. 4 shows a paperchromatogram of the ferrioxamines in the system V: tertiary butanol–water-saturated aqueous sodium chloride solution; –0.1 N NCl (50:25:25:1), paper impregnated with acetone-water-saturated aqueous sodium chloride solution (6:3:1).

Ferrioxamine A hydrochloride is a brown-red powder which is readily soluble in water, methanol, alcohol, glacial acetic acid and dimethylformamide. It is insoluble in ether, acetone, ethyl acetate and chloroform. $R_f$ in solvent system I 0.35, in solvent system V 0.21 (Table I). Partition coefficient in system VI 0.111 (Table I). Paper electrophoresis, cf. FIG. 5. Microanalysis: C 44.21%, H 7.52%, N 12.63%, Fe 7.95%, Cl 5.93%. Titration: $pK_{MCS}$ 9.89, equivalent weight 634. Ultraviolet spectrum in water:

$$\lambda \text{ max. } 430 \text{ m}\mu \ (E_{1 \text{ cm.}}^{1\%} = 37)$$

Figure 11:
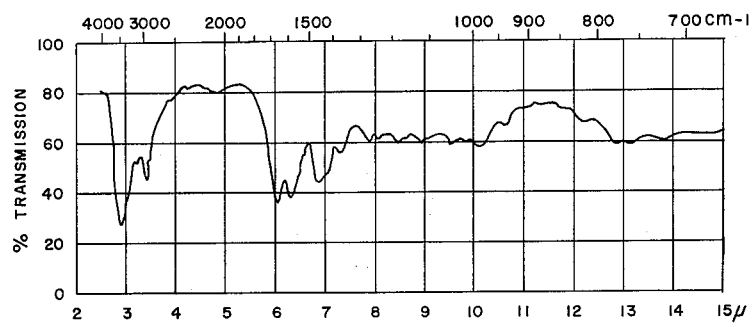
FIG. 11 shows the infra-red spectrum of ferrioxamine A in potassium bromide.

The infrared spectrum in postassium bromide shows: inter alia bands at 2.92$\mu$ (s.), 3.42$\mu$ (m.), 6.10$\mu$ (s.), 6.32$\mu$ (s.), 6.88$\mu$ (m.), 7.30$\mu$ (w.), 7.92$\mu$ (w.), 8.10$\mu$ (w.), 8.49$\mu$ (w.), 8.98$\mu$ (w.), 9.55$\mu$ (w.), 10.15$\mu$ (w.), 10.67$\mu$ (w.) (see FIG. 11).

Ferrioxamine A gives a positive colour reaction with ninhydrin. The iron bound in ferrioxamine A is removed from the complex when subjected to the action of a mineral acid or of strong alkali. Iron free ferrioxamine A is colorless. It can be transformed back to ferrioxamine A with ferric chloride. It reacts also with other metal ions with formation of the corresponding metal complexes, for example the greenish colored copper-complex.

EXAMPLE 12

Figure 7:
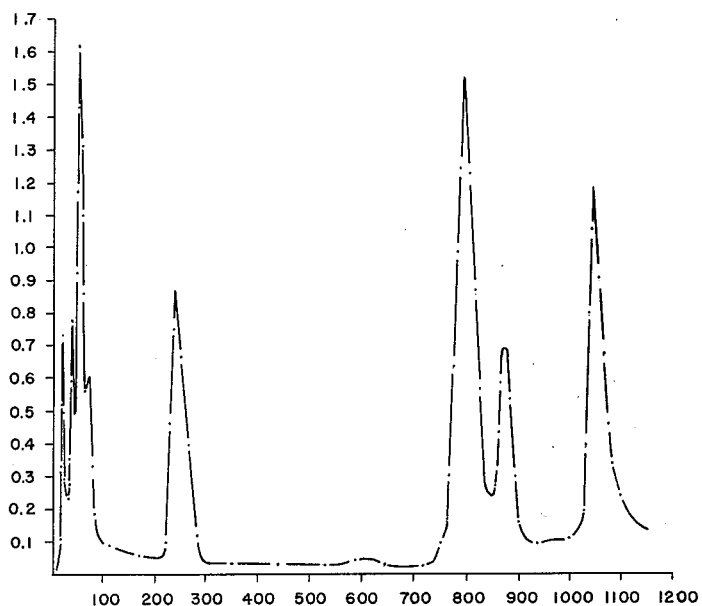
FIG. 7 shows a chromatogram of fraction IV of FIG. 1 on Dowex 50–WX₂ using an ammonium acetate buffer as eluting agent –.–.–. Extinction at 425 mμ.

5 grams of fraction IV (see Example 6) are chromatographed on a Dowex 50–$WX_2$ column by the method described in Example 11: buffer solution at the beginning, 0.1-molar ammonium acetate, pH 4.5. Percolation rate: 110 cc. per hour. Volumes of the eluate fractions: 35–40 cc. (see FIG. 7). Switch over to gradient elution with 1-molar ammonium acetate of pH 4.6 at fraction 720, with 2-molar ammonium acetate pH 4.7 at fraction 963.

| Fractions No. | Weight in mg. | Substances |
|---|---|---|
| 34–46 | 135 | Not closely characterized substances. |
| 54–68 | 226 |  |
| 218–284 |  | Yellow-green fluorescent substances, not isolated. |
| 780–830 | 430 | Ferrioxamine B hydrochloride. |
| 860–900 | 194 | Ferrioxamine C hydrochloride. |
| 1034–1080 | 360 | Not closely characterized substance. |

Ferrioxamine C hydrochloride shows approximately the same solubilities as A. $R_f$ in solvent system I 0.54, in solvent system V 0.37 (Table I). Paper electrophoresis, see FIG. 5; partition coefficient in system VI 0.489 (Table I). Microanalysis: C 48.33%, H 7.92%, N 10.20%, Cl 5.15%, Fe 6.182%. Titration: $pK_{MCS}$ 8.88; equivalent weight 762. Ultraviolet spectrum in water $$\lambda \text{ max. } 430 \text{ m}\mu \ (E^{1\%}_{1\,cm.}=39)$$

Figure 12:
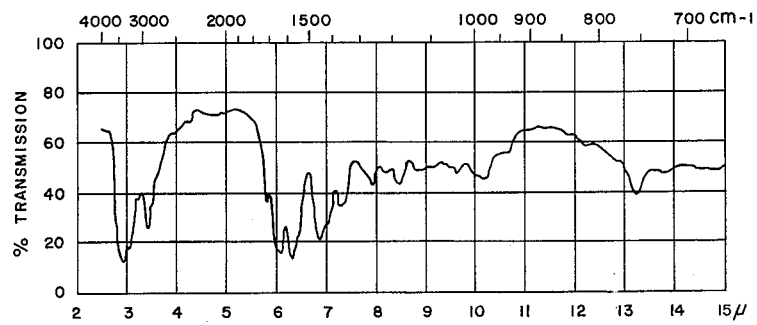
FIG. 12 shows the infra-red spectrum of ferrioxamine C in potassium bromide.

The infrared spectrum in potassium bromide shows inter alia bands at 2.92µ (s.), 3.43µ (s.), 5.85µ (m.), 6.10µ (s.), 6.33µ (s.), 6.87µ (s.), 7.30µ (m.), 7.95µ (m.), 8.23µ (w.), 8.52µ (m.), 9.65µ (w.), 13.23µ (m.) (see FIG. 12).

Ferrioxamine C gives a postive color reaction with ninhydrin. The iron bound in ferrioxamine C is removed from the complex when subjected to the action of a mineral acid or of strong alkali. Iron free ferrioxamine C is colorless. It can be transformed back to ferrioxamine C with ferric chloride. It reacts also with other metal ions with formation of the corresponding metal complexes, for example the greenish colored copper-complex.

EXAMPLE 13

148 grams of fraction V (see Example 6) are prefractionated on a column of Dowex 50–WX₂ of 150 cm. x 79 sq. cm. The chromatogram is developed at a percolation rate of 2 to 3 liters per hour for 24 hours each with 0.1-molar, 0.2-molar, 0.6-molar and for 100 hours with 1.8-molar ammonium acetate buffer of pH 4.7. Fractions of 5 liters are collected. The combined fractions 2–5 contain predominantly ferrioxamines $D_1$, $D_2$ and E (44 grams), 48–55 mainly ferrioxamine F (8.4 grams).

*Rechromatography of fractions 2–5*: 5 grams of fractions 2–5 are chromatographed under the same conditions as fraction II but without any gradient elution (see FIG. 8).

| Fraction No. | Weight in mg. | Substances |
|---|---|---|
| 48–56 | 980 | Ferrioxamine $D_1$ and $D_2$. |
| 66–80 | 898 | Ferrioxamine E. |

The mixture of $D_1$ and $D_2$ (980 mg.) isolated from fractions 48–56 with phenol-chloroform is dissolved in 100 cc. of water, saturated with sodium chloride and extracted twice with the same volume of chloroform. After being dried over sodium sulfate and evaporated, the chloroform extract leaves 697 mg. of ferrioxamine $D_1$. The aqueous refined phase is washed thoroughly with chloroform and then extracted with a mixture of phenol and chloroform. On working up this extract in the usual manner 95 mg. of ferrioxamine $D_2$ are obtained. Ferrioxamine $D_1$ is readily soluble in water, methanol, alcohol, glacial acetic acid, methyl Cellosolve and chloroform, sparingly soluble in ether, acetone, ethyl acetate, pyridine and dimethylformamide. It crystallizes from a mixture of methanol and ether in red needles. After being crystallized three times it melts at 194–200° C. $R_f$ in solvent system I 0.73, $R_f$ in solvent system V 0.72 (Table I).

Partition coefficient in system VI 1.80 (Table I). Electrophoresis, see FIG. 5. Microanalysis: C 49.31%, H 7.47%, N 12.37%, Cl 0%, Fe 7.66%. Titration: no acid or basic functions detectable. Ultraviolet spectrum in water:

$$\lambda \text{ max. } 430 \text{ m}\mu, \ E^{1\%}_{1\,cm.}=44$$

Figure 13:
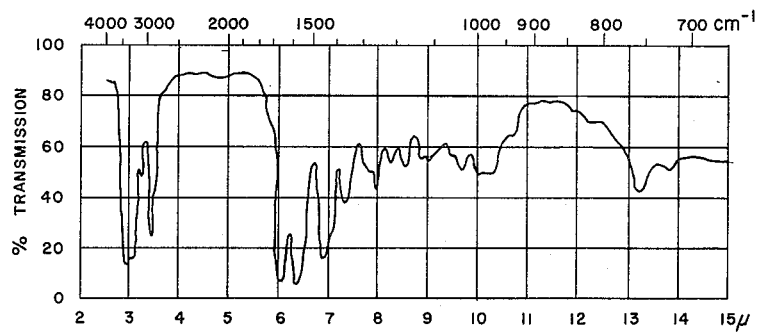
FIG. 13 shows the infra-red spectrum of ferrioxamine $D_1$ in potassium bromide.

Infrared spectrum in potassium bromide: inter alia bands at 2.95µ (s.), 3.06µ (s.), 3.25µ (w.), 3.43µ (s.),6.08µ (s.), 6.35µ(s), 6.86µ (s.), 7.30µ (m.), 7.94µ (m.), 8.20µ (w.), 8.49µ (w.), 8.83µ (w.), 9.00µ (w.), 9.65µ (w.), 10.00µ (w.), 10.31µ (w.), 10.67µ (w.), 12.20µ (w.), 13.30µ (m.) (see FIG. 13).

Ferrioxamine $D_1$ gives no color reaction with ninhydrin. The iron bound in ferrioxamine $D_1$ is removed from the complex when subjected to the action of a mineral acid or of strong alkali. Iron free ferrioxamine $D_1$ is colorless. It can be transformed back to ferrioxamine $D_1$ with ferric chloride. It reacts also with other metal ions with formation of the corresponding metal complexes, for example the greenish colored copper-complex.

Figure 16:
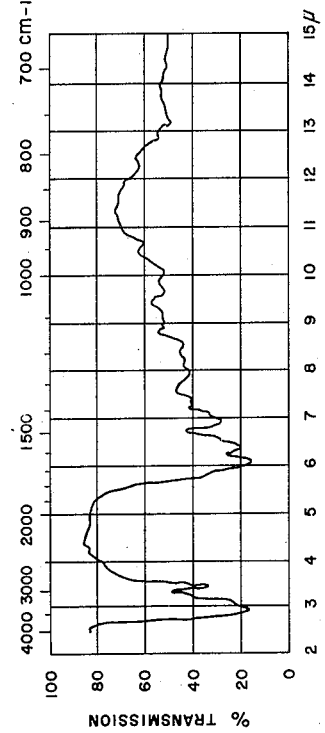
FIG. 16 shows in infra-red spectrum of ferrioxamine $D_2$ in potassium bromide.

Ferrioxamine $D_2$: Infrared spectrum in potassium bromide, inter alia bands at 2.95µ (s.), 3.43µ (m.), 6.08µ (s.), 6.36µ (s.), 6.90µ (s.), 8.49µ (w.), 8.87µ (w.), 9.65µ (w.), 10.05µ (w.), 10.70µ (w.), 13.22µ (w.) see FIG. 16). $R_f$ in solvent system I 0.64, $R_f$ in solvent system V 0.68 (Table I). Paper electrophoresis see FIG. 5.

Ferrioxamine E: The ferrioxamine E obtained from fractions 66–80 (898 mg.) is soluble in glacial acetic acid sparingly soluble to insoluble in most solvents, particularly in water and methanol. Recrystallization twice from such water and acetone yields a microcrystalline powder. $R_f$-values in solvent system I 0.68, in solvent system V 0.59 (Table I). Paper electrophoresis, see FIG. 5. Partition coefficient in system VI 1.59 (Table I). Microanalysis: C 49.80%, H 7.37%, N 12.48%, Cl 0%, Fe 8.14%. Titration: no acid or basic functions detectable. Ultraviolet spectrum in water:

$$\lambda \text{ max. } 430 \text{ m}\mu \ (E^{1\%}_{1\,cm.}=42)$$

Figure 14:
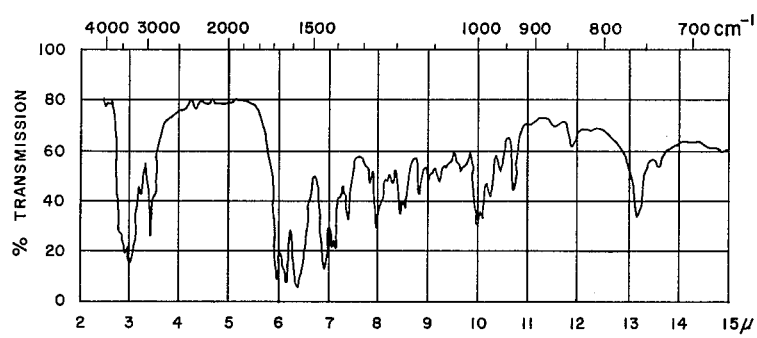
FIG. 14 shows the infra-red spectrum of ferrioxamine E in potassium bromide.

The infrared spectrum in potassium bromide inter alia bands at 2.92µ (s.), 3.02µ (s.), 3.54µ (s.), 5.96µ (s.), 6.15µ (s.), 6.36µ (s.), 6.90µ (s.), 7.10µ (m.), 7.15µ (m.), 7.39µ (m.), 7.82µ (w.), 7.98µ (m.), 8.45µ (w.), 8.54µ (w.), 8.85µ (w.), 9.01µ (w.), 9.20µ (w.), 9.98µ (m.), 10.07µ (w.), 10.23µ (w.), 10.43µ (w.), 10.71µ (w.), 11.87µ (w.), 13.20µ (m.), 13.66µ (w.) (see FIG. 14).

Ferrioxamine E gives no color reaction with ninhydrin. The iron bound in ferrioxamine E is removed from the complex when subjected to the action of a mineral acid or of strong alkali. Iron free ferrioxamine E is colorless. It can be transformed back to ferrioxamine E with ferric chloride. It reacts also with other metal ions with formation of the corresponding metal complexes, for example the greenish colored copper-complex.

Figure 15:
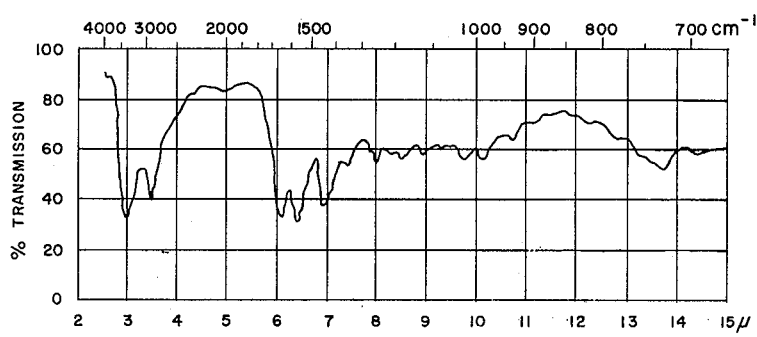
FIG. 15 shows the infra-red spectrum of ferrioxamine F in potassium bromide.

*Rechromatography of fractions 48–55.*—5 grams of fractions 48–55 are rechromatographed under the same conditions as fractions 2–5 (see above). Buffer solution at the beginning: 0.5-molar ammonium acetate of pH 4.7. Switch over to gradient elution with a mixing vessel of 4 liters capacity and the addition of 2-molar ammonium acetate buffer of pH 4.7 at fraction 663 (cf. FIG. 9). Fractions 821–880 contain 1.12 grams of material which consists chiefly of ferrioxamine F. For the purpose of further purification this material is subjected to Craig's countercurrent distribution over 20 stages (10/10 cc.) in the system n-butanol-water. The contents of the elements are then extracted with 80 cc. of petroleum ether each, the petroleum ether phases are discarded and the aqueous refined product lyophilized. With the material (570 mg.) obtained from the elements 1–4 the distribution is repeated over 30 stages. From element 5 there are obtained 64 mg. of paper-chromatographically uniform ferrioxamine F hydrochloride in the form of a brown-red powder. Ferioxamine F hydochloride is readily soluble in water, methanol, pyridine, glacial acetic acid, ethanol, dimethylformamide; sparingly soluble in chloroform, insoluble in ethyl acetate, acetone and ether. Microanalysis: C 50.44%, H 7.29%, N 10.53%, Cl 4.10%, Fe 5.57%, $R_f$ in solvent system V 0.80 (Table I). Partition coefficient in system VI 3.12 (Table I). Electrophoresis see FIG. 5. Titration: $pK_{MCS}$ 9.75, equivalent weight 695. The infrared absorption spectrum in potassium bromide shows inter alia bands at 2.95μ (s.), 3.45μ (m.), 6.10μ (s.), 6.37μ (s.), 6.92μ (m.), 7.40μ (w.), 7.97μ (w.), 8.50μ (w.), 8.88μ (w.), 9.72μ (w.), 10.10μ (w.), 10.70μ (w.), 13.75μ (w.), see FIG. 15. Ultraviolet absorption in $H_2O$:

$$\lambda \text{ max. } 430 \text{ m}\mu, E_{1\ cm.}^{1\%} = 34$$

Ferrioxamine F gives a positive color reaction with ninhydrin. The iron bound in ferrioxamine F is removed from the complex when subjected to the action of a mineral acid or of strong alkali. Iron free ferrioxamine F is colorless. It can be transformed back to ferrioxamine F with ferric chloride. It reacts also with other metal ions with formation of the corresponding metal complexes, for example the greenish colored copper-complex.

EXAMPLE 14

A suspension of 100 grams of fresh bakers' yeast in 1 liter of methanol is vigorously stirred for 30 minutes, then filtered and the methanolic solution is concentrated in vacuo to 200 cc. This concentrate is treated with 200 cc. of water and the solution is clarified by filtration or centrifugation. The clarified solution is extracted three times with a mixture of 1 part by weight of phenol in 1 part by volume of chloroform. A little filter aid (Hyflo-Supercel) is added to the combined organic phases and this suspension is treated while being continuously stirred with an excess of ether. The precipitated crude ferrioxamine, together with the filter aid, is filtered off, washed with ether and dried. The ferrioxamines are eluted from the filter aid with methanol. The methanolic solution is cautiously evaporated in vacuo to yield the ferrioxamines in the form of an active reddish brown resin which can be purified by paper-chromatography.

Preparations having a similarly high content of ferrioxamines are obtained when instead of bakers' yeast a commercial yeast extract, expressed brewers' yeast or a fresh yeast culture is worked up as described above.

EXAMPLE 15

Representatives of the family of the chlorophyceae, for instance *Chlamydomonas eugametos*, are cultivated submerged at 24° C. on a nutrient solution containing:

| | |
|---|---|
| Magnesium sulfate | g 2.5 |
| Secondary potassium phosphate | g 1.25 |
| Urea | g 1.05 |
| Tap water | liter 1 |
| Trace element solution | cc 10 |

The trace element solutions contain per liter:

| | G. |
|---|---|
| $CaCl_2$ | 8.35 |
| $H_3BO_3$ | 11.42 |
| $FeSO_4 \cdot 7H_2O$ | 4.98 |
| $ZnSO_4 \cdot 7H_2O$ | 8.82 |
| $MnCl_2 \cdot 4H_2O$ | 1.44 |
| $H_2MoO_4$ | 0.71 |
| $CuSO_4 \cdot 5H_2O$ | 1.57 |
| $Co(NO_3)_2 \cdot 6H_2O$ | 0.49 |
| Complexon III | 3 |

The nutrient solution is sterilised in the culture vessels for 20 to 30 minutes at 1 atmosphere gauge, and inoculated with up to 20% of a submerged culture. The cultures are aerated in the shaking vessels of 4 liter capacity continuously with ¼ volume of air per volume of solution per minute. After a cultivation period of 4–12 days under continuous irradiation the intensely green cultures are worked up. Without filtering, the cultures are treated with 2% of alumina, for example Frankonit, and vigorously mixed. The suspension is filtered with addition of a filter assistant and the solution is again treated with 2% of alumina, stirred and filtered. The combined filter residues are washed with water and methanol and then eluted with a mixture of pyridine and water (1:4). The azeotropic mixture is concentrated in vacuo and the ferrioxamines are isolated from the concentrates by freeze-drying. The reddish brown preparations can be further enriched as described above.

EXAMPLE 16

Young tomato plants (*Solanum lycopersicum* L. of the family of the Solanaceae) about 50 cm. high are squeezed out in a juice press. 1 liter of the juice is freed from chlorophyll by being extracted three times with ethyl acetate. 290 grams of ammonium sulfate are added to the brown aqueous phase, the resulting solution is filtered and then extracted three times with benzyl alcohol. The combined organic phases are dried by adding sodium sulfate and then treated with an excess of ethyl acetate. The resulting precipitate is washed with ether and then taken up in a small amount of water. Freeze-drying finally yields an active ferrioxamine preparation which can be worked up as described in the preceding examples.

Preparations having a similar activity are obtained by using leaves of *Rheoe discolor* instead of tomato plants.

EXAMPLE 17

Bacillus subtilis is cultivated by the submersion method on a nutrient solution containing per liter of tap water 10 grams of crude glucose, 5 grams of peptone, 3 grams of meat extract, 5 grams of potassium chloride and 10 grams of lime. The cultures are incubated at 33–37° C. while being aerated by shaking or stirring. After an incubation period of 48–96 hours the cultures are treated without being filtered with 2% of alumina (Frankonit), vigorously stirred and then clarified by filtration of centrifugation. The sediment is washed with methanol and then eluted with a 1:4-mixture of pyridine and water. The eluate contains the bulk of the ferrioxamines, which are isolated as described above.

What is claimed is:

1. Process for the manufacture of a member selected from the group consisting of the ferrioxamines A, B, C, $D_1$, $D_2$, E and F and mixtures thereof, which comprises cultivating a member selected from the group consisting of *Streptomyces griseoflavus, Streptomyces lavendulae, Streptomyces galilaeus, Streptomyces pilosus, Streptomyces polychromogenus, Streptomyces viridochromogenes, Streptomyces aureofaciens, Streptomyces olivaceus, Streptomyces griseus* and *Streptomyces glaucescens* in a nutrient solution containing a source of carbon and of nitrogen and inorganic salts until the culture medium contains ferrioxamines, then isolating said ferrioxamines from the culture medium.

2. Process for the manufacture of a member selected from the group consisting of the ferrioxamines A, B, C, $D_1$, $D_2$, E and F and mixtures thereof, which comprises cultivating *Streptomyces pilosus* NRRL 2857 in a nutrient solution containing a source of carbon and of nitrogen and inorganic salts until the culture medium contains ferrioxamines, filtering, adding an aqueous ferro-salt solution to the filtrate, filtering and extracting the filtrate with a mixture of phenol and chloroform, precipitating the ferrioxamines from the extract with a mixture of ether and petroleum ether, eluting the precipitate with methanol and removing the solvent.

3. Process as claimed in claim 1, wherein the crude ferrioxamines are separated into the components by distribution in an organic-aqueous system containing benzyl alcohol in the organic phase.

4. Process according to claim 2, wherein the crude mixture of ferrioxamines is distributed in the system n-butanol–benzyl alcohol–water-saturated aqueous sodium chloride solution–1-n-hydrochloric acid (100:200:300:60:6) to isolate the components A, B, C, $D_1$, $D_2$, E and F.

References Cited in the file of this patent

UNITED STATES PATENTS

| | | |
|---|---|---|
| 2,422,230 | Foster | June 17, 1947 |
| 2,472,453 | Wolf | June 7, 1949 |
| 2,472,640 | Wilcox | June 7, 1949 |
| 2,541,726 | Trussell | Feb. 13, 1951 |